US012728752B2

(12) United States Patent
Nayak et al.

(10) Patent No.: US 12,728,752 B2
(45) Date of Patent: Sep. 8, 2026

(54) METHOD, APPARATUS, AND SYSTEM FOR PROVIDING ELECTRIC VEHICLE CHARGING UNITS TO ELECTRIC VEHICLES

(71) Applicant: HERE GLOBAL B.V., Eindhoven (NL)

(72) Inventors: Amarnath Nayak, Mumbai (IN); Jerome Beaurepaire, Paris (FR)

(73) Assignee: HERE GLOBAL B.V., Eindhoven (NL)

(*) Notice: Subject to any disclaimer, the term of this patent is extended or adjusted under 35 U.S.C. 154(b) by 197 days.

(21) Appl. No.: 18/653,984

(22) Filed: May 3, 2024

(65) Prior Publication Data

US 2025/0340148 A1 Nov. 6, 2025

(51) Int. Cl.
*B60L 53/62* (2019.01)
*B60L 53/57* (2019.01)
(Continued)

(52) U.S. Cl.
CPC ................ *B60L 53/62* (2019.02); *G06N 7/01* (2023.01); *G06N 20/00* (2019.01); *B60L 53/57* (2019.02)

(58) Field of Classification Search
CPC ...... B60L 53/62; B60L 53/57; B60L 2260/46; B60L 53/63; B60L 53/66; B60L 53/67;
(Continued)

(56) References Cited

U.S. PATENT DOCUMENTS 12,384,271 B2 * 8/2025 Kim ........................ B60L 58/12
2018/0060776 A1 * 3/2018 Ahmed ................ G07C 5/0808
(Continued)

FOREIGN PATENT DOCUMENTS

JP 2020522789 A 7/2020
JP 7478226 B2 * 5/2024 ............. B60L 53/60
(Continued)

OTHER PUBLICATIONS

アハティカリ ユッシ, Aug. 15, 2019 English Machine Translation_ JP7478226B2 / JP2022549999A provided by Patent Translate by EPO and Google (Year: 2019).*
(Continued)

*Primary Examiner* — Ashley L Redhead, Jr.
(74) *Attorney, Agent, or Firm* — Peter H. Yu; HERE GLOBAL B.V.

(57) ABSTRACT

An apparatus, method and computer program product are provided for determining a location for deploying an electric vehicle charging unit (EVCU). In one example, an apparatus divides a zone into a plurality of subregions and causes a machine learning model to output a probability of which an EVCU is needed at each of the plurality of subregion based on one or more attributes associated with the subregion. The apparatus generates one or more clusters within the zone, where each of the one or more clusters include one or more of the plurality of subregions. The apparatus calculates a value for each of the one or more clusters based on the probability associated with each subregion within said cluster. The apparatus selects one of the one or more clusters based on the value and assigns a location within the one of the one or more clusters for deploying the EVCU.

20 Claims, 17 Drawing Sheets

(51) Int. Cl.
*G06N 7/01* (2023.01)
*G06N 20/00* (2019.01)

(58) Field of Classification Search
CPC .......... B60L 53/68; G06N 7/01; G06N 20/00; Y02T 10/70
See application file for complete search history.

(56) References Cited

U.S. PATENT DOCUMENTS

| | | | | |
|---|---|---|---|---|
| 2024/0361137 | A1* | 10/2024 | Aviv | B60L 58/12 |
| 2024/0416794 | A1* | 12/2024 | Tseng | B60L 58/12 |
| 2025/0236198 | A1* | 7/2025 | Hinduja | G06N 3/08 |
| 2025/0310736 | A1* | 10/2025 | Brannan | B60L 58/12 |
| 2025/0313114 | A1* | 10/2025 | Parness | B60L 53/62 |
| 2025/0340148 | A1* | 11/2025 | Nayak | B60L 53/63 |
| 2025/0392125 | A1* | 12/2025 | Wilder | H02J 3/003 |

FOREIGN PATENT DOCUMENTS

| | | | |
|---|---|---|---|
| WO | 2018217640 | A1 | 11/2018 |
| WO | 2023058066 | A1 | 4/2023 |

OTHER PUBLICATIONS

Deb, "Machine Learning for Solving Charging Infrastructure Planning Problems: A Comprehensive Review", Energies, vol. 14, Nov. 23, 2021, 19 Pages.
Boulakhbar et al., "A Deep Learning Approach for Prediction of Electrical Vehicle Charging Stations Power Demand in Regulated Electricity Markets: The Case of Morocco", Cleaner Energy Systems, vol. 3, Dec. 2022, 7 Pages.
Almaghrebi et al., "Data-driven Charging Demand Prediction at Public Charging Stations Using Supervised Machine Learning Regression Methods", Energies, vol. 13, Aug. 16, 2020, 21 Pages.
Hecht et al., "Predicting Electric Vehicle Charging Station Availability Using Ensemble Machine Learning", Energies, vol. 14, Nov. 23, 2021, 24 Pages.

* cited by examiner

FIG. 2B

| 0.02 | 0.03 | 0.03 | 0.02 | 0.04 | 0.02 | 0.02 | 0.01 | 0.01 | 0.01 | 0.01 |
|---|---|---|---|---|---|---|---|---|---|---|
| 0.01 | 0.05 | 0.01 | 0.08 | 0.20 | 0.08 | 0.07 | 0.03 | 0.01 | 0.01 | 0.03 |
| 0.02 | 0.07 | 0.12 | 0.15 | 0.31 | 0.21 | 0.11 | 0.03 | 0.02 | 0.03 | 0.09 |
| 0.02 | 0.05 | 0.11 | 0.22 | 0.44 | 0.34 | 0.18 | 0.03 | 0.02 | 0.01 | 0.01 |
| 0.01 | 0.05 | 0.13 | 0.11 | 0.25 | 0.33 | 0.21 | 0.03 | 0.02 | 0.08 | 0.02 |
| 0.06 | 0.02 | 0.05 | 0.11 | 0.10 | 0.05 | 0.31 | 0.22 | 0.11 | 0.17 | 0.11 |
| 0.11 | 0.13 | 0.03 | 0.12 | 0.03 | 0.17 | 0.34 | 0.61 | 0.52 | 0.13 | 0.11 |
| 0.10 | 0.17 | 0.34 | 0.23 | 0.15 | 0.06 | 0.02 | 0.03 | 0.02 | 0.12 | 0.10 |
| 0.09 | 0.33 | 0.59 | 0.38 | 0.13 | 0.03 | 0.05 | 0.01 | 0.02 | 0.10 | 0.10 |
| 0.13 | 0.22 | 0.45 | 0.23 | 0.20 | 0.04 | 0.01 | 0.03 | 0.02 | 0.10 | 0.01 |
| 0.01 | 0.20 | 0.41 | 0.29 | 0.13 | 0.01 | 0.01 | 0.02 | 0.02 | 0.10 | 0.09 |

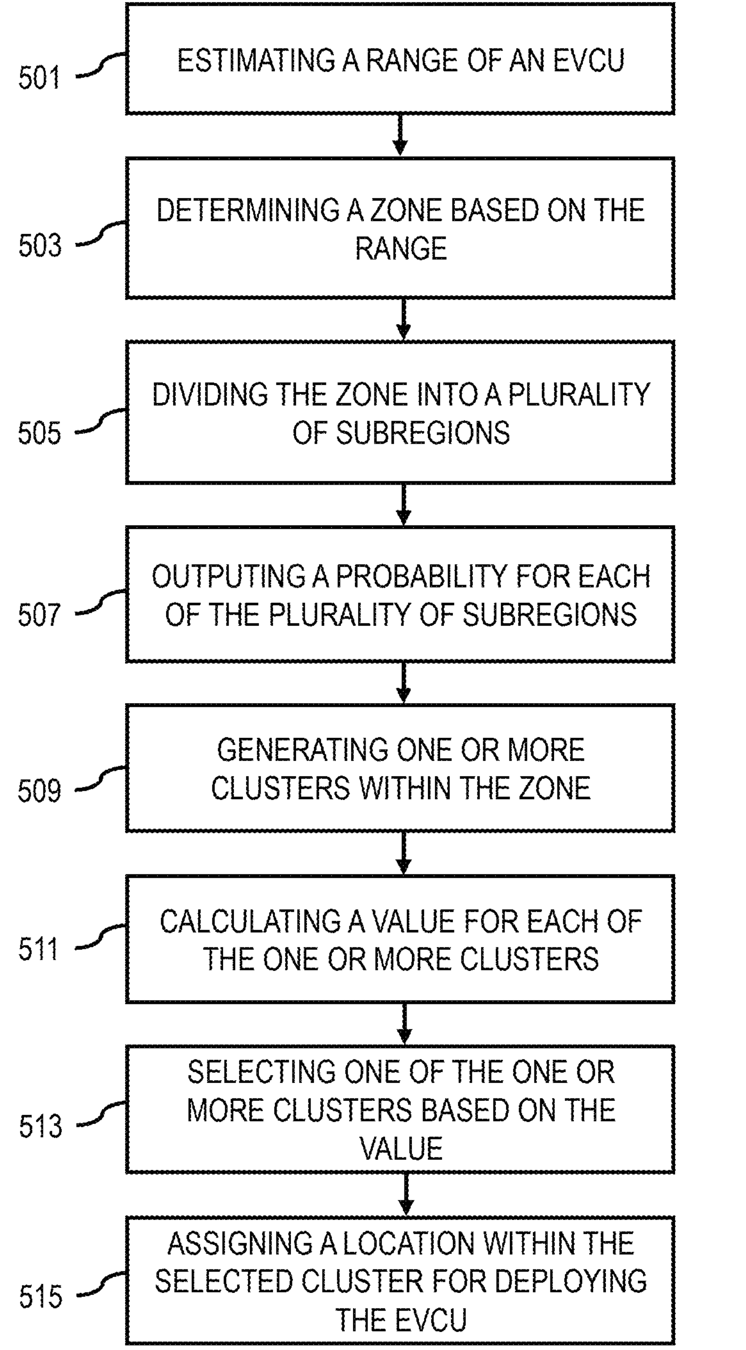
FIG. 5
500
501
ESTIMATING A RANGE OF AN EVCU
503
DETERMINING A ZONE BASED ON THE RANGE
505
DIVIDING THE ZONE INTO A PLURALITY OF SUBREGIONS
507
OUTPUTING A PROBABILITY FOR EACH OF THE PLURALITY OF SUBREGIONS
509
GENERATING ONE OR MORE CLUSTERS WITHIN THE ZONE
511
CALCULATING A VALUE FOR EACH OF THE ONE OR MORE CLUSTERS
513
SELECTING ONE OF THE ONE OR MORE CLUSTERS BASED ON THE VALUE
515
ASSIGNING A LOCATION WITHIN THE SELECTED CLUSTER FOR DEPLOYING THE EVCU FIG. 6
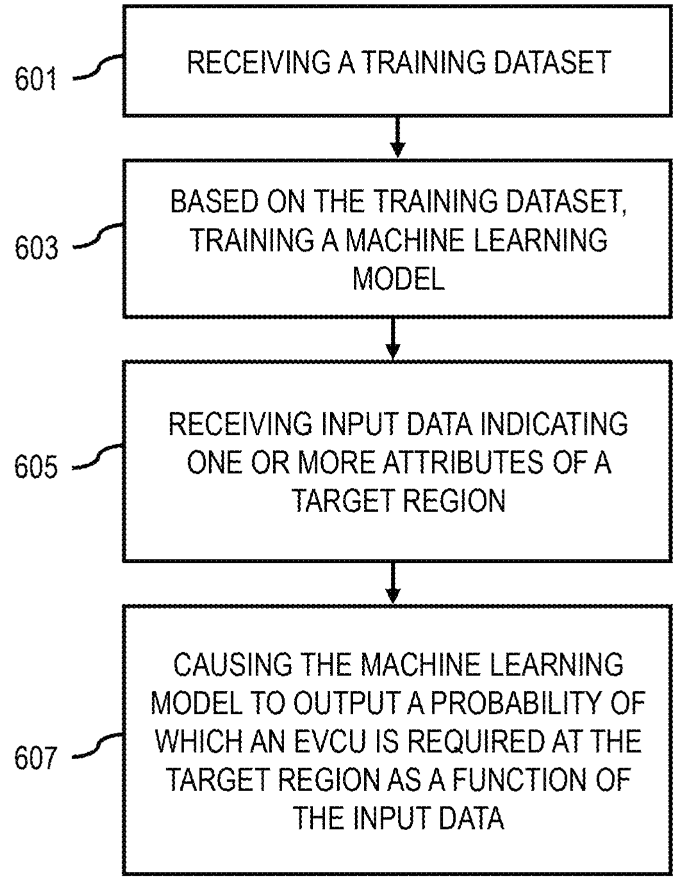

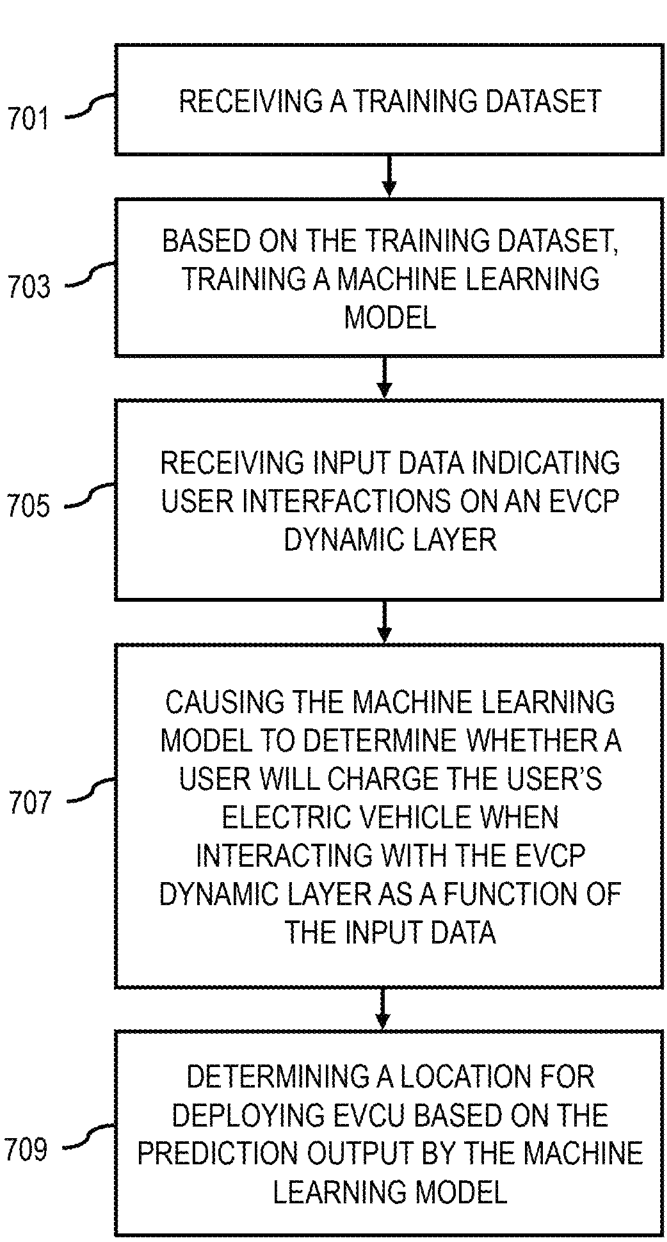
FIG. 7
700
701
RECEIVING A TRAINING DATASET
703
BASED ON THE TRAINING DATASET, TRAINING A MACHINE LEARNING MODEL
705
RECEIVING INPUT DATA INDICATING USER INTERFACTIONS ON AN EVCP DYNAMIC LAYER
707
CAUSING THE MACHINE LEARNING MODEL TO DETERMINE WHETHER A USER WILL CHARGE THE USER'S ELECTRIC VEHICLE WHEN INTERACTING WITH THE EVCP DYNAMIC LAYER AS A FUNCTION OF THE INPUT DATA
709
DETERMINING A LOCATION FOR DEPLOYING EVCU BASED ON THE PREDICTION OUTPUT BY THE MACHINE LEARNING MODEL FIG. 8
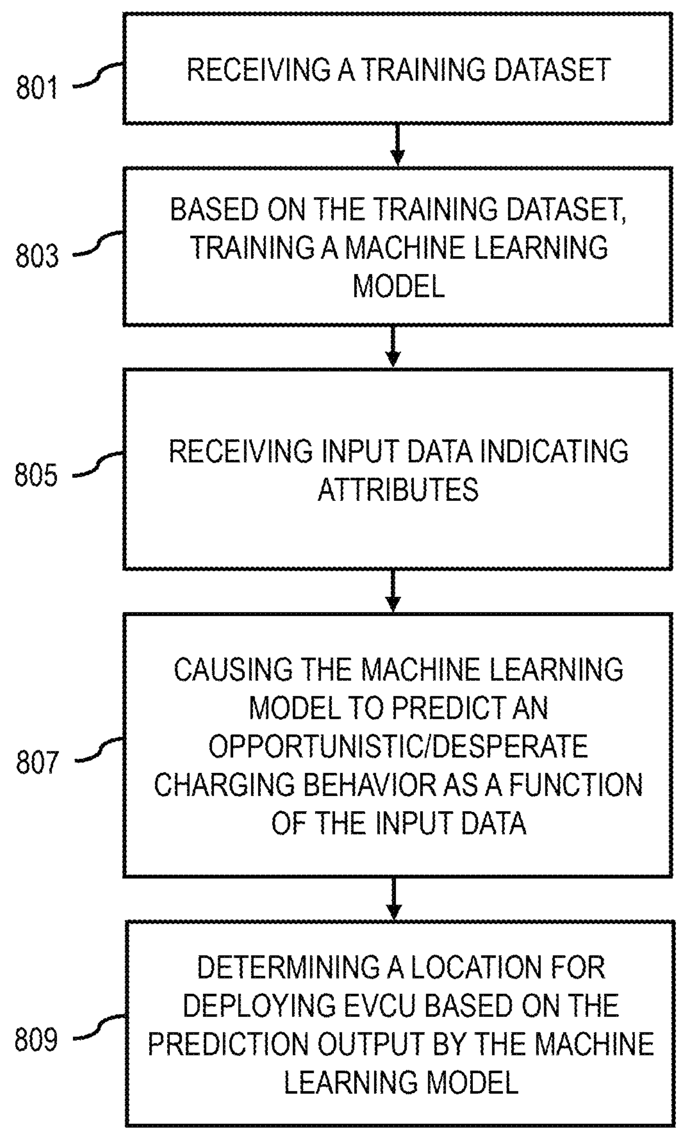

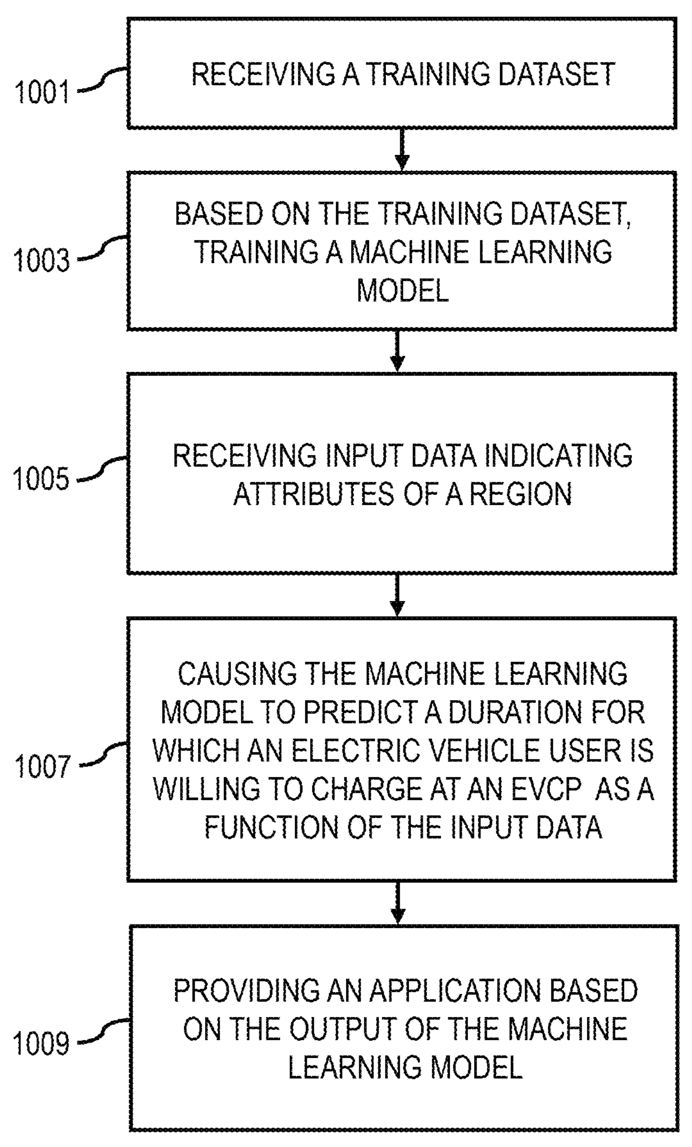
FIG. 10
1000
1001
RECEIVING A TRAINING DATASET
1003
BASED ON THE TRAINING DATASET, TRAINING A MACHINE LEARNING MODEL
1005
RECEIVING INPUT DATA INDICATING ATTRIBUTES OF A REGION
1007
CAUSING THE MACHINE LEARNING MODEL TO PREDICT A DURATION FOR WHICH AN ELECTRIC VEHICLE USER IS WILLING TO CHARGE AT AN EVCP AS A FUNCTION OF THE INPUT DATA
1009
PROVIDING AN APPLICATION BASED ON THE OUTPUT OF THE MACHINE LEARNING MODEL 1100
RECEIVING HISTORICAL DATA INDICATING A STATE OF CHARGE OF A POWER SUPPLY OF AN EVCU
1101
BASED ON THE HISTORICAL DATA, TRAINING A TIME SERIES FORECASTING MODEL
1103
RECEIVING INPUT DATA
1105
CAUSING THE TIME SERIES FORECASTING MODEL TO PREDICT A STATE OF CHARGE OF THE POWER SUPPLY
1107
PROVIDING AN APPLICATION BASED ON THE OUTPUT OF THE TIME SERIES FORECASTING MODEL
1109

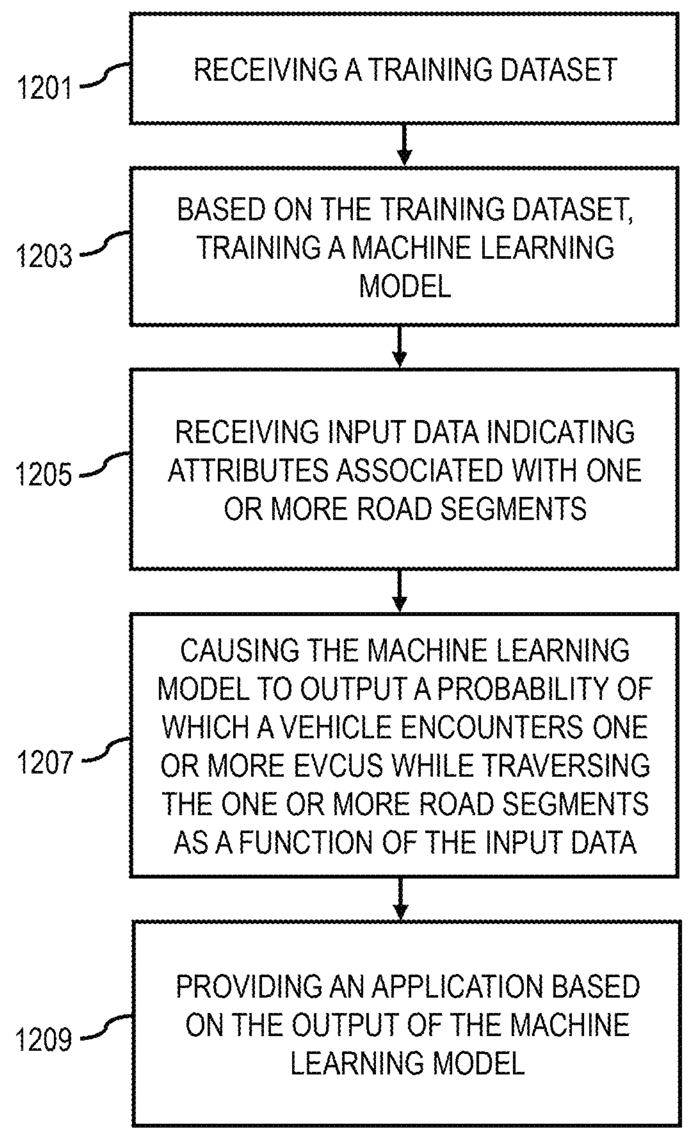
FIG. 12
1200
1201
RECEIVING A TRAINING DATASET
1203
BASED ON THE TRAINING DATASET, TRAINING A MACHINE LEARNING MODEL
1205
RECEIVING INPUT DATA INDICATING ATTRIBUTES ASSOCIATED WITH ONE OR MORE ROAD SEGMENTS
1207
CAUSING THE MACHINE LEARNING MODEL TO OUTPUT A PROBABILITY OF WHICH A VEHICLE ENCOUNTERS ONE OR MORE EVCUS WHILE TRAVERSING THE ONE OR MORE ROAD SEGMENTS AS A FUNCTION OF THE INPUT DATA
1209
PROVIDING AN APPLICATION BASED ON THE OUTPUT OF THE MACHINE LEARNING MODEL

1300

1390 INTERNET
1392 SERVER
1384 INTERNET SERVICE PROVIDER
1380 LOCAL NETWORK
1382 HOST
1378 NETWORK LINK
1300
1370 COMMUNICATION INTERFACE
1304 MEMORY
1302 PROCESSOR
1306 READ ONLY MEMORY
1310 BUS
1308 STORAGE DEVICE
1320 APPLICATION SPECIFIC IC (ASIC)
1314 DISPLAY
1312 INPUT DEVICE
1316 POINTING DEVICE

MOBILE TERMINAL
1501
1509
AUDIO INTERFACE
1513
CODEC
ADC
DAC
1523
1543
1511
1545
1505
DSP
ASIC BACKPLANE
MCU
1503
MEMORY
1551
1525
Equalizer
1515
1541
Demodulator
1539
Down-Converter
1537
LNA
1521
Duplexer
1517
1535
RF Interface
1529
Synthesizer
1533
Modulator
1527
Up-Converter
1531
PA
1519
Keyboard
1547
Display
1507
SIM Card
1549
Battery Interface & Power Control
1520

METHOD, APPARATUS, AND SYSTEM FOR PROVIDING ELECTRIC VEHICLE CHARGING UNITS TO ELECTRIC VEHICLES

BACKGROUND

Electric vehicles are ever growing market in the automobile industry. To accommodate the increase of electric vehicles in a road network, electric vehicle charging stations are established to provide electric power to these vehicles. However, given that electric vehicles are new in the market in comparison to conventional vehicles, such as internal combustion engines (ICE) vehicles, the number of infrastructures for accommodating electric vehicles (e.g., electric vehicle charging stations) is much less than the number of infrastructures for accommodating ICE vehicles (e.g., gas stations). As such, opportunities for recharging electric vehicles are less frequent than opportunities for refueling ICE vehicles. Additionally, durations for recharging electric vehicles from empty to full are generally greater than durations for refueling ICE vehicles from empty to full. Thus, electric vehicle users typically experience a greater queue time for recharging their vehicles in comparison to ICE vehicle users. Further, electric vehicle users must recharge their vehicles more frequently than ICE vehicle users because an average range of an electric vehicle with a maximum state of charge is typically less than an average range of an ICE vehicle with a maximum fuel amount. As such, all these limitations of electric vehicles exacerbate the growing need for services that can readily provide power to electric vehicles.

SOME EXAMPLE EMBODIMENTS

Therefore, there is a need for an approach for providing electric power supply to electric vehicles.

According to one embodiment, an apparatus including at least one processor and at least one non-transitory memory is described. The at least one non-transitory memory includes computer program code instructions, and the computer program code instructions are configured to, when executed, cause the apparatus to: receive a training dataset indicating information associated with electric vehicles having a state of charge that is less than a predetermined amount, wherein the information indicates, for each of the electric vehicles, one or more attributes of a region in which said electric vehicle was located while having the state of charge; and based on the training dataset, train a machine learning model to output a probability of which an electric vehicle charging unit (EVCU) is required at a target region as a function of input data indicating one or more attributes of the target region.

In some embodiments, the one or more attributes of the region indicates: (i) an average number of electric vehicles within the region; (ii) one or more lengths of one or more functional classes of one or more road segments within the region; (iii) a vehicle density of the region; (iv) a vehicle congestion level of the region; (v) a weather condition of the region; (vi) a number of electric vehicle charging stations within the region; or (vii) a combination thereof.

In some embodiments, the one or more attributes of the target region indicates: (i) an average number of electric vehicles within the target region; (ii) one or more lengths of one or more functional classes of one or more road segments within the target region; (iii) a vehicle density of the target region; (iv) a vehicle congestion level of the target region; (v) a weather condition of the target region; (vi) a number of electric vehicle charging stations within the target region; or (vii) a combination thereof.

In some embodiments, the predetermined amount is less than half of a maximum state of charge for each of the electric vehicles.

In some embodiments, the computer program code instructions are configured to, when executed, cause the apparatus to, subsequent to training the machine learning model based on the training dataset: receive the input data; provide the input data to the machine learning model; and cause the machine learning model to output the probability.

In some embodiments, the computer program code instructions are configured to, when executed, cause the apparatus to, subsequent to training the machine learning model based on the training dataset: estimate a range of which the EVCU is capable of traversing; determine a zone encompassing a geographical region based on the range; divide the zone into a plurality of subregions; for each of the plurality of subregions: receive the input data, wherein the target region is said subregion; provide the input data to the machine learning model; cause the machine learning model to output the probability; and associate said subregion with the probability; generate one or more clusters within the zone, wherein each of the one or more clusters include one or more of the plurality of subregions; calculate a value for each of the one or more clusters based on the probability associated with each subregion within said cluster; select one of the one or more clusters based on the value; and assign a location within the one of the one or more clusters for deploying the EVCU.

In some embodiments, the one or more clusters are generated via k-means clustering.

In some embodiments, the value is a mean value of all probabilities of all subregions within said cluster.

In some embodiments, the one of the one or more clusters has the greatest mean value among the one or more clusters.

In some embodiments, the location is a centroid of the one of the one or more clusters.

According to another embodiment, a non-transitory computer-readable storage medium having computer program code instructions stored therein is described. The computer program code instructions, when executed by at least one processor, cause the at least one processor to: receive a training dataset indicating information associated with electric vehicles having a state of charge that is less than a predetermined amount, wherein the information indicates, for each of the electric vehicles, one or more attributes of a region in which said electric vehicle was located while having the state of charge; and based on the training dataset, train a machine learning model to output a probability of which an EVCU is required in a target region as a function of input data indicating one or more attributes of the target region.

According to another embodiment, a method for providing an EVCU is described. The method includes receiving a training dataset indicating information associated with electric vehicles having a state of charge that is less than a predetermined amount, wherein the information indicates, for each of the electric vehicles, one or more attributes of a region in which said electric vehicle was located while having the state of charge; and based on the training dataset, training a machine learning model to output a probability of which an electric vehicle charging unit (EVCU) is required at a target region as a function of input data indicating one or more attributes of the target region.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 2A and 2B illustrate a zone encompassing a geographic region, a plurality of subregions of the zone, and a probability associated with each of the plurality of subregions, according to one example embodiment;

FIG. 5 illustrates a flowchart of a process for determining a location for deploying an EVCU, according to one example embodiment;

FIG. 6 illustrates a flowchart of a process for training a machine learning model for determining a probability of which an EVCU is required at a region based on one or more attributes of the region, according to one example embodiment;

FIG. 7 illustrates a flowchart of a process for determining a location for deploying an EVCU based at least in part on user interactions of a dynamic EVCP layer, according to one example embodiment;

FIG. 8 illustrates a flowchart of a process for determining a location for deploying an EVCU based at least in part on user behaviors for charging electric vehicles, according to one example embodiment;

FIG. 10 illustrates a flowchart of a process for predicting a duration for which an electric vehicle user is willing to charge at an EVCP and providing an application based on the prediction, according to one example embodiment;

FIG. 12 illustrates a flowchart of a process for determining a probability of which a vehicle encounters one or more EVCUs while traversing one or more road segments and providing an application based on the probability, according to one example embodiment;

DESCRIPTION OF SOME EMBODIMENTS

Figure 1:
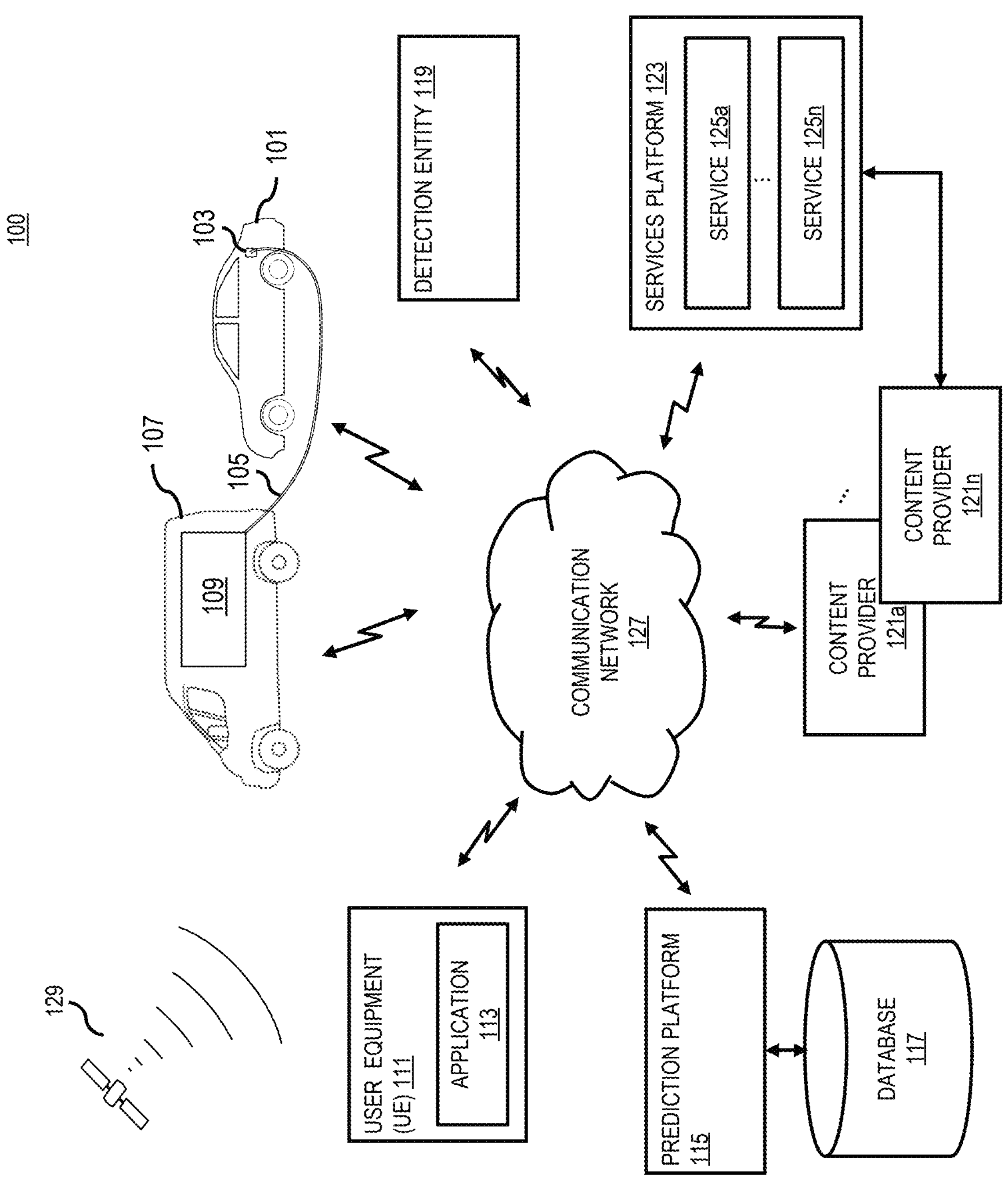
FIG. 1 illustrates a diagram of a system for providing EVCUs to electric vehicles, according to one example embodiment.

Examples of a method, apparatus, and computer program for providing electric vehicle charging units (EVCUs) for electric vehicles are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Reference in this specification to “one embodiment” or “an embodiment” means that a particular feature, structure, or characteristic described in connection with the embodiment is included in at least one embodiment of the present disclosure. The appearance of the phrase “in one embodiment” in various places in the specification are not necessarily all referring to the same embodiment, nor are separate or alternative embodiments mutually exclusive of other embodiments. In addition, the embodiments described herein are provided by example, and as such, “one embodiment” can also be used synonymously as “one example embodiment.” Further, the terms “a” and “an” herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

In efforts to provide electric power supply to electric vehicles in roadways, EVCUs may be deployed at various locations to provide convivence for charging electric vehicles. An EVCU may be a vehicle, such as a powered vehicle (e.g., an ICE vehicle, an electric vehicle, a hybrid vehicle, a hydrogen-powered vehicle, etc.) or an unpowered vehicle (e.g., a trailer) that is capable of being towed by a powered vehicle, that stores an electric power supply that can be electrically coupled to one or more electric vehicles to provide electric power thereto.

An EVCU can be advantageously deployed in a region that is highly dense with electric vehicles such that electric vehicle users that frequent the region may conveniently use the EVCU as a charging station. Additionally, an EVCU may be beneficial for temporary events and gatherings involving congregation of many electric vehicles, such as concerts, festivals, or sports events, remote areas lacking infrastructures that may necessitate electric vehicle charging capabilities (e.g., campgrounds or rural areas), emergencies that require electric vehicle charging sessions (e.g., events in which natural disasters have occurred), etc. Once an EVCU power supply is depleted, it may be recharged at a charging station (or by another EVCU), and the EVCU may be redeployed at the same region or another region with demands for electric power supply. One distinction between an EVCU and a charging station is that an EVCU is capable of moving to different locations and function as a charging station at said locations, whereas a charging station is an infrastructure fixed at a specific location. Another distinction between an EVCU and a charging station is that an EVCU typically has a limited amount of power supply, whereas a charging station is electrically coupled to a stable source of power supply (e.g., a power grid) and supply power to electric vehicles though said source.

One of the challenges of utilizing an EVCU is determining where to deploy the EVCU. One approach involves using conventional infrastructure planning for installing electric vehicle charging stations as a method for deploying EVCUs. For example, such planning may recommend installing electric vehicle charging stations in highly populated regions, and based on that tactic, EVCUs may be deployed in other highly populated regions. However, such approach may not be the most efficient way of providing electric power supply to a wide range of electric vehicles since electric vehicle power demands vary from region to region and frequently change over time. Another challenge with the use of EVCUs is that an electric power supply capacity of an EVCU is limited. As such, managing power distribution for an EVCU is crucial for ensuring that the EVCU accommodates many electric vehicles. Therefore, there is a need for a system that accounts for the aforementioned challenges and efficiently distributes EVCUs to various regions to meet varying power demands of electric vehicles.

FIG. 1 illustrates a diagram of a system 100 for providing EVCUs to electric vehicles, according to one example embodiment. In the illustrated embodiment, the system includes an electric vehicle 101, an EVCU 107, a user equipment (UE) 111, a prediction platform 115, a database 117, a detection entity 119, content providers 121*a*-121*n*, a services platform 123, a communication network 127 and a satellite 129. In one embodiment, the prediction platform 115 outputs an optimal location for deploying the EVCU 107 based on data indicating attributes of a region. The attributes may be related to road segments, classification of road segments, vehicle density, vehicle congestion level, weather conditions, a number of electric vehicle charging stations within a region, etc. Data indicating the attributes may be acquired by the detection entity 105, which may be roadside sensors (e.g., traffic cameras), vehicle sensors, other sensors available within a road network that are capable of acquiring geographic features of a region, or personnel designated to record information regarding geographic features of a region. The content providers 121 and the services platform 123 may also acquire data indicating the attributes, and the data may be stored in the database 117 for providing the output at the prediction platform 115. A user of the electric vehicle 101 may access an application 113 via the UE 111 to identify information associated with the EVCU 107, thereby enabling the user to locate and use the EVCU 107.

In the illustrated embodiment, the UE 111 has connectivity to the prediction platform 115 via the communication network 121. The UE 111 may be any type of mobile terminal or fixed terminal such as a mobile handset, station, unit, device, multimedia computer, multimedia tablet, Internet node, communicator, cellular telephone, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, devices associated with or integrated with a vehicle (e.g., as part of an infotainment system), or any combination thereof, including the accessories and peripherals of these devices. In one embodiment, the UE 111 can be an in-vehicle navigation system, a personal navigation device (PND), a portable navigation device, a cellular telephone, a mobile phone, a personal digital assistant (PDA), a watch, a camera, a computer, and/or other device that can perform navigation-related functions, such as digital routing and map display. In one embodiment, the UE 111 may support any type of interface to the user (such as “wearable” devices, etc.).

In the illustrated embodiment, the application 113 may be executable by the UE 111 and enable an electric vehicle user to identify the location of the EVCU 107 and/or one or more locations of one or more other EVCUs and facilitate/permit access to the EVCU 107 and/or the one or more other EVCUs for use. In one embodiment, the application 113 may cause a user interface of the UE 111 to present a map and locations of EVCUs within a predetermined distance from a designated location (e.g., the location of the UE 111, the location of the electric vehicle 101, or a user-selected location). The application 113 may also cause the user interface to provide availability of EVCUs, display a current or predicted state of charge of a power supply of an EVCU, display a route and a probability of which an electric vehicle user will encounter an EVCU within the route, receive user inputs via the user interface to receive reservations of EVCUs, and enable other interactions via the user interface to facilitate utilization of EVCUs. The utility of the UE 111 and the application 113 is not limited to electric vehicles/ electric vehicle users seeking EVCUs. In one embodiment, the UE 111 and the application 113 may be provided for drivers of EVCUs such that the drivers may receive instructions including locations for deploying the EVCUs and use the instructions to maneuver the EVCUs to the locations. In one embodiment, the UE 111 and the application 113 may be provided for personnel designated for managing deployments of EVCUs such that the personnel may create instructions including locations for deploying the EVCUs. In one embodiment, the application 113 may be other applications executable by the UE 111, such as a mapping application, a location-based service application, a navigation application, a content provisioning service, a camera/imaging application, a media player application, a social networking application, a calendar application, or any combination thereof. In one embodiment, the application 113 may act as a client for the prediction platform 115 and perform one or more functions associated with the functions of the prediction platform 115 by interacting with the prediction platform 115 over the communication network 127.

The electric vehicle 101 includes parts related to mobility, such as a powertrain with an electrically-powered engine, a transmission, a suspension, a driveshaft, and/or wheels, etc. The electric vehicle 101 further includes an electric power supply for driving the engine and supplying power to various electrical components equipped within the electric vehicle 101 (e.g., HVAC, lightings, infotainment system, user interface, etc.). The electric vehicle 101 may include sensors for estimating a state of charge of the electric power supply and a user interface for communicating the state of charge and other relevant information to a user of the electric vehicle 101, such as the range of the vehicle based on the current state of charge, electrical loads of the electric vehicle 101, etc. In one embodiment, the electric vehicle 101 may include a computing system capable of incorporating an application such as the application 113 and provide services to a user of the electric vehicle 101 directly through the user interface available within the electric vehicle 101. In one embodiment, the user interface, the computing system, and a communication interface available within the electric vehicle 101 function as a medium for providing information to the prediction platform 115 and receiving and utilizing data output from the prediction platform 115. The electric vehicle 101 may be equipped with a power receptacle 103 that enables the power supply of the electric vehicle 101 to electrically couple with a power source and draw power. In the illustrated embodiment, the electric vehicle 101 is electrically coupled to an electric power supply 109 of the EVCU 107 via an electrical connector 105 and is drawing power from the electric power supply 109.

In one embodiment, the electric vehicle 101 may be equipped with image sensors (e.g., electronic imaging devices of both analog and digital types, which include digital cameras, camera modules, camera phones, thermal imaging devices, radar, sonar, lidar, etc.), a network detection sensor for detecting wireless signals or receivers for different short-range communications (e.g., Bluetooth, Wi-Fi, Li-Fi, near field communication (NFC), etc.), temporal information sensors, an audio recorder for gathering audio data, velocity sensors, light sensors, oriental sensors augmented with height sensor and acceleration sensor, traction sensor, suspension sensor, tilt sensors to detect the degree of incline or decline of the electric vehicle 101 along a path of travel, etc. Sensors about the perimeter of the electric vehicle 101 may detect the relative distance of the electric vehicle 101 from stationary objects (e.g., construct, wall, etc.), road objects, lanes, or roadways, the presence of other vehicles, pedestrians, traffic lights, road features (e.g., curves) and any other objects, or a combination thereof. Sensors may also detect orientations of such objects. The electric vehicle 101 may include GPS receivers to obtain geographic coordinates from the satellites 123 for determining current location and time associated with the electric vehicle 101. Further, the location can be determined by a triangulation system such as A-GPS, Cell of Origin, or other location extrapolation technologies.

In one embodiment, the electric vehicle 101 may be an autonomous vehicle or a semi-autonomous vehicle (e.g., a vehicle with partial automation). The term autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The autonomous vehicle may steer, brake, or accelerate the vehicle based on the position of the vehicle in order, and may respond to lane marking indicators (lane marking type, lane marking intensity, lane marking color, lane marking offset, lane marking width, or other characteristics) and driving commands or navigation commands. In one embodiment, the electric vehicle 101 may be assigned with an autonomous level. An autonomous level of a vehicle can be a Level 0 autonomous level that corresponds to a negligible automation for the vehicle, a Level 1 autonomous level that corresponds to a certain degree of driver assistance for the vehicle 205, a Level 2 autonomous level that corresponds to partial automation for the vehicle, a Level 3 autonomous level that corresponds to conditional automation for the vehicle, a Level 4 autonomous level that corresponds to high automation for the vehicle, a Level 5 autonomous level that corresponds to full automation for the vehicle, and/or another sub-level associated with a degree of autonomous driving for the vehicle.

In one embodiment, the electric vehicle 101 may be a highly assisted driving (HAD) vehicle or an advanced driving assistance systems (ADAS) vehicle. An HAD vehicle may refer to a vehicle that does not completely replace the human operator. Instead, in a highly assisted driving mode, a vehicle may perform some driving functions and the human operator may perform some driving functions. Such vehicle may also be driven in a manual mode in which the human operator exercises a degree of control over the movement of the vehicle. The electric vehicle 101 may also include a completely driverless mode. The HAD vehicle may control the vehicle through steering or braking in response to the on the position of the vehicle and may respond to lane marking indicators (lane marking type, lane marking intensity, lane marking color, lane marking offset, lane marking width, or other characteristics) and driving commands or navigation commands. Similarly, ADAS vehicles include one or more partially automated systems in which the vehicle alerts the driver. The features are designed to avoid collisions automatically. Features may include adaptive cruise control, automate braking, or steering adjustments to keep the driver in the correct lane. ADAS vehicles may issue warnings for the driver based on the position of the vehicle or based on the lane marking indicators (lane marking type, lane marking intensity, lane marking color, lane marking offset, lane marking width, or other characteristics) and driving commands or navigation commands.

In the illustrated embodiment, the EVCU 107 is a powered vehicle and includes the electric power supply 109 for enabling one or more electric vehicles to be electrically coupled thereto and draw power from the power supply 109. In one embodiment, the EVCU 107 may be an electric vehicle, an ICE vehicle, a hybrid vehicle, or a hydrogen fuel-cell vehicle. In one embodiment, the EVCU 107 may be equipped with a separate power supply for powering its engine, one or more other electric components of the EVCU 107, or a combination thereof. In an alternative embodiment, the power supply 109 may not be limited to solely charging electric vehicles and may be used for supplying the engine of the EVCU 107, one or more other electric components of the EVCU 107, or a combination thereof. In one embodiment, the EVCU 107 is an unpowered vehicle, such as a trailer, that is capable of being towed by a powered vehicle.

The EVCU 107 may include sensors for estimating a state of charge of the electric power supply 109, a communication interface for communicatively coupling to another communication device (e.g., one or more other entities within the system 100, such as the prediction platform 115, that establish communication via the communication network 127), and a computing system for calculating the state of charge and other relevant information associated with the EVCU 107. In one embodiment, the computing system of the EVCU 107 and the communication interface within the EVCU 107 may establish communication with the prediction platform 115 such that EVCU 107 may receive instructions as to where to move and instructions for charging electric vehicles (e.g., charging duration, charge amount, which electric vehicles have access to the EVCU 107 for charging, etc.). In one embodiment, the EVCU 107 may be equipped with a user interface (e.g., a user interface disposed on an outer surface of the EVCU 107) that enables an electric vehicle user to access the EVCU 107, acquire information associated with the EVCU 107, reserve the EVCU 107, or a combination thereof. In one embodiment, the computing system, and a communication interface available within the EVCU 107 function as a medium for providing information to the prediction platform 115 and receiving data output from the prediction platform 115. In one embodiment, the EVCU 107 may be an autonomous or semi-autonomous vehicle and may receive instructions to automatically traverse to a designated location for distributing power to electric vehicles at said location.

The detection entity 119 may be a vehicle, a drone, a user equipment, a road-side sensor, or a device mounted on a stationary object within or proximate to a road segment (e.g., a traffic light post, a sign post, a post, a building, etc.). The detection entity 119 includes one or more image sensors such as electronic imaging devices of both analog and digital types, which include digital cameras, camera modules, camera phones, thermal imaging devices, radar, sonar, lidar, etc. The detection entity 119 may further include a network detection sensor for detecting wireless signals or receivers for different short-range communications (e.g., Bluetooth, Wi-Fi, Li-Fi, near field communication (NFC), etc.), temporal information sensors, an audio recorder for gathering audio data, velocity sensors, light sensors, oriental sensors augmented with height sensor and acceleration sensor, tilt sensors to detect the degree of incline or decline of the detection entity 119 along a path of travel, etc. In one embodiment, sensors about the perimeter of the detection entity 119 may detect the relative distance of the detection entity 119 from road objects, lanes, or roadways, the presence of other vehicles, pedestrians, traffic lights, road features (e.g., curves) and any other objects, or a combination thereof. In one embodiment, sensors equipped by the detection entity 119 may also detect orientations of objects. In one embodiment, the detection entity 119 may include GPS receivers to obtain geographic coordinates from satellites 199 for determining current location and time associated with the detection entity 199. Further, the location can be determined by a triangulation system such as A-GPS, Cell of Origin, or other location extrapolation technologies. The detection entity 199 may further include a receiver and a transmitter for maintaining communication with the prediction platform 115 and/or other components within the system 100.

The services platform 123 may provide one or more services 125*a*-125*n* (collectively referred to as services 125), such as mapping services, navigation services, travel planning services, weather-based services, emergency-based services, notification services, social networking services, content (e.g., audio, video, images, etc.) provisioning services, application services, storage services, contextual information determination services, location-based services, information-based services, etc. In one embodiment, the services platform 123 may be an original equipment manufacturer (OEM) platform. In one embodiment, the one or more services 125 may be sensor data collection services. By way of example, vehicle sensor data provided by one or more vehicles (such as the electric vehicle 101 and/or a vehicle identified as the detection entity 119) may be transferred to the UE 111, the prediction platform 115, the database 117, or other entities communicatively coupled to the communication network 127 through the service platform 123. In one embodiment, the services platform 123 uses the output data generated by the prediction platform 115 to provide services such as navigation, mapping, other location-based services, etc. In one embodiment, the services platform 123 may provide services that may aid in providing EVCUs to electric vehicles.

In one embodiment, the content providers 121*a*-121*n* (collectively referred to as content providers 121) may provide content or data (e.g., including geographic data, parametric representations of mapped features, etc.) to the electric vehicle 101, the UE 111, the prediction platform 115, the database 117, the services platform 123, or the combination thereof. In one embodiment, the content provided may be any type of content, such as map content, textual content, audio content, video content, image content, etc. In one embodiment, the content providers 123 may provide content that may aid in providing EVCUs to electric vehicles. In one embodiment, the content providers 121 may store content associated with the UE 111, the prediction platform 115, the database 117, the services platform 123, or the combination thereof. In another embodiment, the content providers 121 may manage access to a central repository of data, and offer a consistent, standard interface to data, such as a repository of the database 117.

The communication network 127 of system 100 includes one or more networks such as a data network, a wireless network, a telephony network, or any combination thereof. The data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, 5G networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

In the illustrated embodiment, the prediction platform 115 may be a platform with multiple interconnected components. The prediction platform 115 may include multiple servers, intelligent networking devices, computing devices, components and corresponding software for determining locations for deploying EVCUs. The prediction platform 115 facilitates utility of EVCUs by determining ideal locations for deploying EVCUs, ideal locations for installing charging stations based on prior EVCU usage, ideal charging sessions at EVCUs, and increasing opportunities for electric vehicles to encounter EVCUs for use. Various embodiments related to such features will be described in detail below.

In one embodiment, the prediction platform 115 determines an ideal location for deploying the EVCU 107 based at least in part on a range of the EVCU 107. In such embodiment, the prediction platform 115 acquires information indicating the range of the EVCU 107 from the EVCU 107. The range indicates the maximum range at which the EVCU 107 is capable of traversing from its current position based on the current condition of the EVCU 107 (e.g., the current fuel level, state of charge, etc.). The prediction platform 115 further acquires an origin coordinate of the EVCU 107, and based on the coordinate and the range of the EVCU 107, the prediction platform 115 determines a zone encompassing a geographical region. The prediction platform 115 divides the zone into a plurality of subregions, and for each of the plurality of subregions, the prediction platform 115 employs a machine learning model that outputs a probability of which the EVCU 107 is required at said subregion based on attributes of the subregion. Details of how the zone and the plurality of subregions are determined will be described with reference to FIGS. 2A and 2B.

Figure 2A:
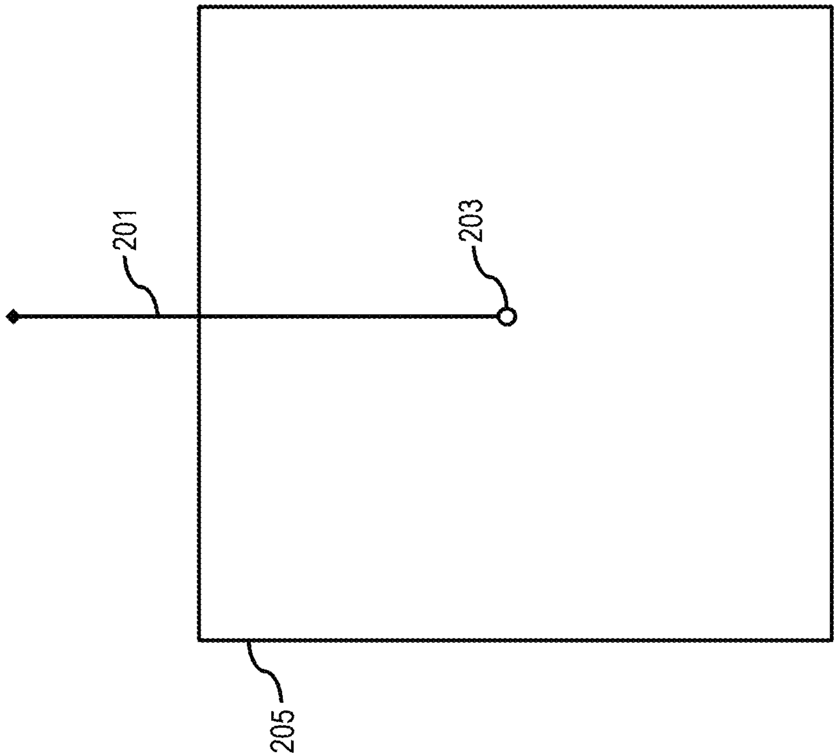

FIG. 2A illustrates a zone encompassing a geographic region, according to one example embodiment. The prediction platform 115 determines a maximum range 201 at which the EVCU 107 is capable of traversing from its current location 203. The maximum range 201 of the EVCU 107 may be estimated based on the current fuel level/state of charge of the EVCU 107. In the case of which the EVCU 107 is an unpowered vehicle capable of being towed, the current fuel level/state of charge of a vehicle that is towing the EVCU 107 is used to determine the maximum range 201. The zone 205 is defined such that the current location 203 of the EVCU 107 is in the center of the zone 205, and the maximum range 201 exceeds a distance from the current location 203 to the outermost boundary of the zone 205. While the zone 205 is a square in the illustrated embodiment, the zone 205 may be any geometric shape, where the distance from the current location 203 to the outermost boundary of the zone 205 is less than the maximum range 201. The distance from the current location 203 to the outermost boundary of the zone 205 is defined as being less than the maximum range 201 to ensure that the EVCU 107 can reach any vehicle-accessible locations within the zone 205 based on the EVCU's current condition. In one embodiment, a geometric shape of the zone 205 is dependent on a shape of an individual granular unit defining a portion of the zone 205. For example, map data are typically represented as tiles, where each tile is a square boundary representing a geographical region and is defined at a certain resolution, and a combination of tiles may form a larger square that encompasses a greater geographical region.

FIG. 2B illustrates a plurality of subregions within the zone and a probability associated with each of the plurality of subregions, according to one example embodiment. In the illustrated embodiment, the zone 205 is divided into a plurality of subregions 207. Each of the plurality of subregions 207 is associated with a probability of which the EVCU 107 is required at said subregion. The prediction platform 115 uses the machine learning model to output the probability based on one or more attributes of the subregion. In the illustrated embodiment, each of the plurality of subregions 207 is a tile of a tile map. In one embodiment, each of the plurality of subregions 207 may have a resolution of 126.58 $m^2$ or less.

Returning to FIG. 1, once the probability is generated for each of the plurality of subregions, the prediction platform 115 selects a subregion among the plurality of subregions and identifies a location within the selected subregion for deploying the EVCU 107. In one embodiment, a subregion among the plurality of subregions that has the greatest probability is selected such that the EVCU 107 is most likely to be used by electric vehicles within said selected region in comparison to other subregions within the plurality of subregions. However, it is contemplated that the value for deploying an EVCU at a location based on probabilities of many subregions outweigh the value of deploying an EVCU based on a probability of a single region. Further, the value of deploying an EVCU within a dense group of subregions with moderate-to-high probabilities may outweigh the value of deploying an EVCU within a subregion with the highest probability that is surrounded by neighboring subregions with low probabilities. Additionally, it may not be readily apparent whether deploying an EVCU within one group of subregions over another group of subregions is advantageous because probabilities of those groups may be similar to each other. As such, in one embodiment, the prediction platform 115 generates one or more clusters and selects a location for deploying an EVCU within one of the one or more clusters. In such embodiment, the prediction platform 115 generates a clustering model to generate one or more clusters within the zone, where each of the one or more clusters includes one or more of the plurality of subregions. A clustering model is a type of unsupervised machine learning model used to group similar data points together based on their inherent characteristics or features. The goal of clustering is to find natural groupings or clusters in the data without any prior knowledge of the groupings. In a clustering model, the algorithm automatically partitions the data into clusters such that data points within the same cluster are more similar to each other compared to data points in different clusters. In one embodiment, the clustering model employed by the prediction platform 115 may be a K-means clustering model. The prediction platform 115 calculates a mean value of all probabilities of all subregions in each of the one or more clusters and selects a cluster among the one or more clusters that has the greatest mean value among the one or more clusters. The prediction platform 115 calculates a centroid of the selected cluster, and a subregion of the selected cluster that corresponds to the centroid is selected as an ideal location for deploying the EVCU 107. In one embodiment, the prediction platform 115 identifies a parking location within said subregion as the designated location for deploying the EVCU 107.

The machine learning model used to calculate the probabilities of the plurality of subregions may be trained based on a training dataset indicating events in which electric vehicles had less than a predetermined amount of state of charge. For example, the predetermined amount of state charge may be 20 percent. It should be appreciated, however, that the predetermined amount may be any value less than 50 percent. Information associated with the events may indicate attributes associated with said events and regions in which said events have occurred. Specifically, the information indicates, for each electric vehicle that had less than the predetermined amount of state of charge, one or more attributes associated with a region in which said electric vehicle was located while having the state of charge less than the predetermined amount. The one or more attributes indicate: (i) an average number of electric vehicles within the region; (ii) one or more lengths of one or more functional classes of one or more road segments within the region (e.g., an average length of each functional class within the region); (iii) a vehicle density of the region; (iv) a vehicle congestion level of the region (e.g., an amount of delay in estimated time of arrival for one or more road segments within the region); (v) a weather condition of the region; (vi) a number of electric vehicle charging stations within the region; (vii) demographic information (e.g., a male to female ratio, education level, etc.); or (viii) a combination thereof. In one embodiment, the machine learning model may be a supervised machine learning model.

A supervised machine learning model learns from labeled data, where each input data point is associated with a corresponding target label. Such model maps inputs to outputs or predicts a target variable based on input features. In supervised learning, a model is trained on a dataset containing input-output pairs. During the training process, the model learns the relationship between the input features and the target labels by adjusting its internal parameters. Once the training is complete, the model can be used to make predictions on new, unseen data.

Figure 3A:
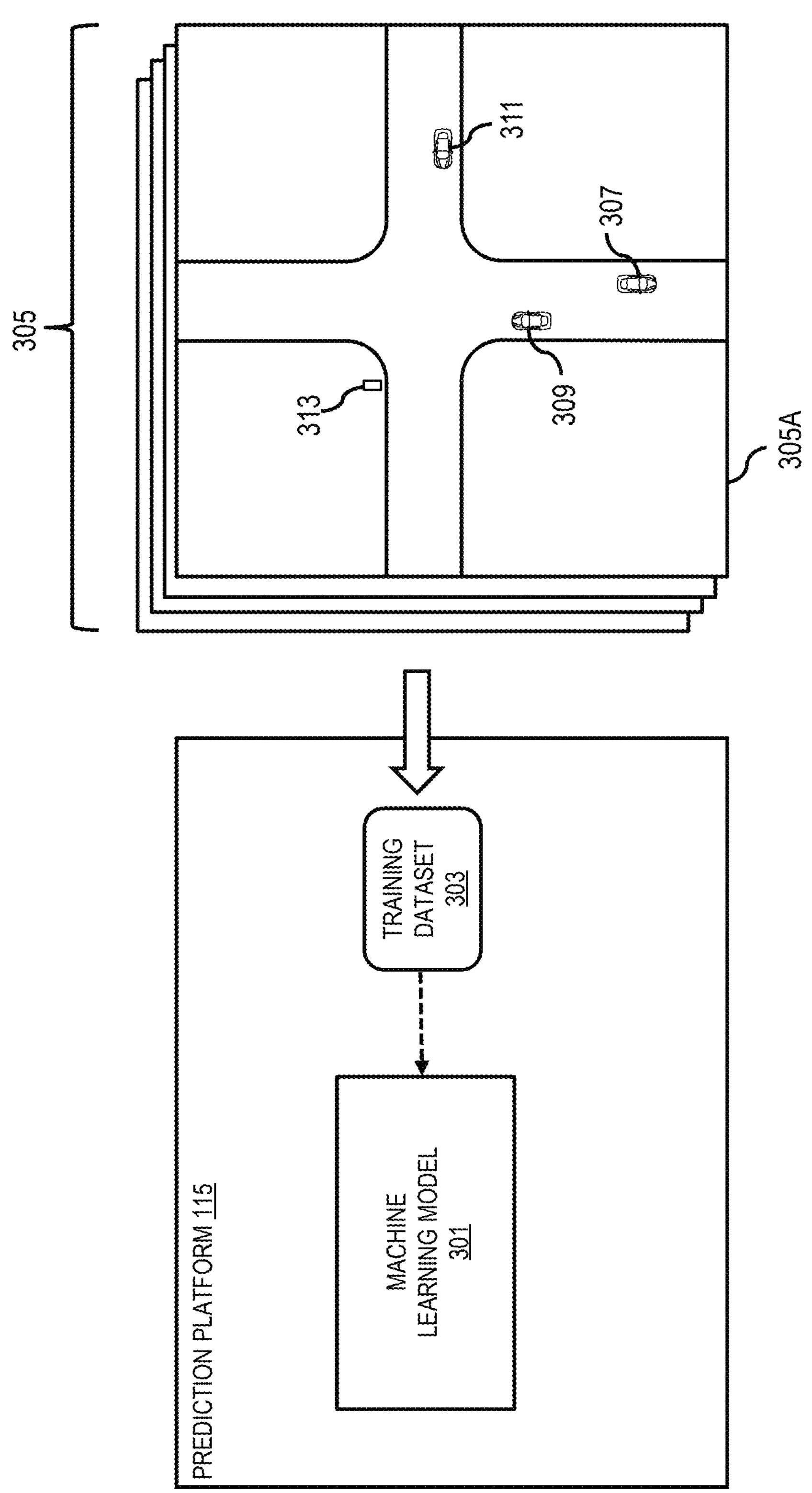
FIGS. 3A and 3B illustrate example scenarios of how a machine learning model of the prediction platform of FIG. 1 is trained and used to output a probability of which an EVCU is needed at a region, according to one example embodiment.
Figure 3B:
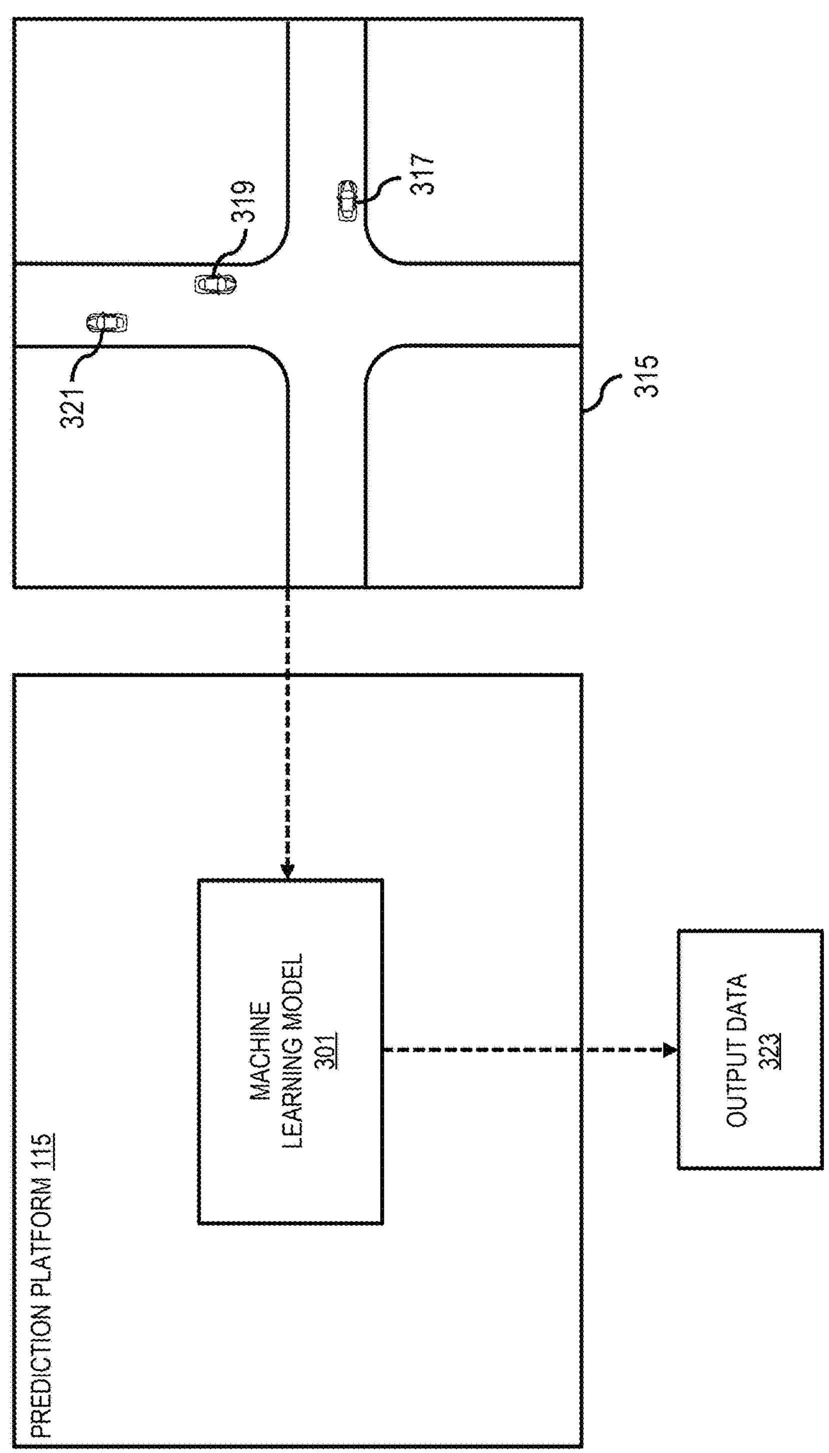

In one embodiment, the machine learning model may be a classification task. In such embodiment, the training dataset may include attributes of regions, where attributes of each of the regions are labeled as either a region that included an electric vehicle having less than the predetermined state of charge or a region that did not include any electric vehicle having less than the predetermined state of charge. The machine learning model may be trained using a classification algorithm, such as logistic regression, decision trees, random forests, support vector machines (SVM), neural networks, etc. Once the machine learning model is trained, the model may output target labels indicating whether or not a target region includes an electric vehicle having less than the predetermined state of charge as a function of input features indicating attributes corresponding to the attributes used to train the machine learning model (e.g., an average number of electric vehicles within the target region, one or more lengths of one or more functional classes of one or more road segments within the target region, etc.). For example, FIGS. 3A and 3B illustrate example scenarios of how a machine learning model of the prediction platform 115 is trained and used to output a probability of which an EVCU is needed at a region, according to one example embodiment. In the illustrated embodiments, the prediction platform 115 includes a machine learning model 301, and the machine learning model may be a supervised machine learning classification model.

In FIG. 3A, a training dataset 303 is generated by the prediction platform 115. The training dataset 303 is generated based on event data 305 indicating events, where each of the events indicate attributes associated with said event and a region in which said event have occurred. Each of the events may indicate whether a region of said event included an electric vehicle having less than the predetermined amount of state of charge (e.g., less than 20 percent) or did not include any electric vehicle having less than the predetermined amount of state of charge. For example, first event data 305A indicate an event of a region in which an electric vehicle 307 had less than the predetermined amount of state of charge and one or more attributes associated with the event. The attributes may indicate: (i) an average number of electric vehicles within the region; (ii) one or more lengths of one or more functional classes of one or more road segments within the region; (iii) a vehicle density of the region; (iv) a vehicle congestion level of the region; (v) a weather condition of the region; (vi) a number of electric vehicle charging stations within the region; (vii) demographic information (e.g., a male to female ratio, education level, etc.); or (viii) a combination thereof. In the illustrated embodiment, each region indicated in the event data 305 may represent a tile of a tile map. In the illustrated embodiment, the event indicated by the first event data 305A involves vehicles 309 and 311 and a roadside sensor 313. The vehicles 309 and 311 are equipped with sensors for acquiring one or more of the attributes associated with the region indicated by the first event data 305A. The attributes associated with the event data 305 may be acquired by detection entities 119 within regions of the events (e.g., the vehicles 309 and 311, the roadside sensor 313, etc.), the database 117, one or more of content providers 121, the services platform 123, or a combination thereof. The prediction platform 115 generates the training dataset 303 such that the attributes of each of the regions of the plurality of event data 305 are labeled as either a region that included an electric vehicle having less than the predetermined state of charge or a region that did not include any electric vehicle having less than the predetermined state of charge. In the illustrated embodiment, the machine learning model 301 is trained using a classification algorithm, such as logistic regression, decision trees, random forests, support vector machines (SVM), neural networks, etc.

In FIG. 3B, the machine learning model 301 is trained, and the prediction platform 115 receives input data 315 indicating attributes of a target region. A target region is a region-of-interest. For example, a target region may be a user-selected region or a region that is selected by a computing system (e.g., the prediction platform 115). In reference to FIG. 2B, a target region may be a subregion among the plurality of subregions. The attributes as indicated by the input data 315 correspond to the event data 305 used to train the machine learning model. For example, a type of attribute identified within the input data 315 (e.g., an average number of electric vehicles within the target region) corresponds to a type of attribute identified in the plurality of event data 305 (e.g., an average number of electric vehicles within the region indicated by the first event data 305A). In the illustrated embodiment, the target region includes vehicles 317, 319, and 321 equipped with sensors for acquiring one or more of the attributes of the target region. As such, the vehicles 317, 319, and 321 may function as detection entities 119. One or more of the attributes of the target region may also be provided by the database 117, one or more of the content providers 121, the services platform 123, or a combination thereof. In the illustrated embodiment, the prediction platform 115 causes the machine learning model 301 to provide output data 323 as a function of the input data 315, where the output data 323 indicates a probability of which an EVCU is required at the target region.

Returning to FIG. 1, the prediction of whether a target region includes an electric vehicle having less than the predetermined amount of state of charge indicates the probability of which the EVCU 107 is required at the target region. For example, target labels may be associated with confidence scores indicating the machine learning model's levels of certainty in its predictions. In such example, the confidence score associated with the target label indicating that the target region includes an electric vehicle having less than the predetermined state of charge may be the probability of which the EVCU 107 is required at the target region.

The aforementioned embodiments of the prediction platform 115 may be incorporated into a system or platform, thereby enabling said system or platform to use existing mapping architecture (e.g., tile map) to provide an ideal location for deploying an EVCU. Additionally, since the location for deploying an EVCU is determined based on a weight of a cluster of subregions rather than that of an individual subregion, the EVCU may provide services to a greater number of electric vehicles at the location in comparison to another location that is outside of the cluster. Moreover, since the machine learning model is trained to output a probability of which an EVCU is needed at a region based on events in which electric vehicles had a low state of charge, an EVCU deployed at a location based on an output of the machine learning model may provide services to a greater number of electric vehicles in comparison to an EVCU that is simply deployed within a region associated with a high vehicle density.

In one embodiment, the prediction platform 115 may determine an ideal location for deploying the EVCU 107 based at least in part on user interactions of a dynamic electric vehicle charging point (EVCP) layer. Herein, an EVCP is either an EVCU or a charging station. The EVCP dynamic layer may be an application executable on a user device and enable an electric vehicle user to identify the location of the EVCU 107, one or more locations of one or more other EVCUs, one or more locations of one or more charging stations, or a combination thereof. The EVCP dynamic layer provide utility to a user by facilitating access to an EVCU or a charging station (e.g., by providing a route to a charging station, instructing how to use an EVCU, etc.) and permit access an EVCU or a charging station for use (e.g., if an EVCU is reserved for use at a designated period, a user may provide information that enables use of the EVCU for the designated period). The mobile EVCP dynamic layer enables a user interface of a user device to present a map and locations of EVCUs and/or charging stations within a predetermined distance from a designated location. The EVCP dynamic layer may also cause the user interface to provide availability of EVCUs and/or charging stations, receive user inputs via the user interface to receive reservations of EVCUs and/or charging stations, and enable other interactions via the user interface to facilitate utilization of EVCUs and/or charging stations. In one embodiment, the EVCP dynamic layer may be the application 113, a part of the application 113, or an application similar to the application 113.

To determine an ideal location for deploying the EVCU 107, the prediction platform 115 may use a machine learning model to predict whether a user needs to charge his/her electric vehicle when interacting with the EVCP dynamic layer within a region, and if the prediction indicates that the user needs to charge, the prediction platform 115 defines the ideal location within the region. The machine learning model may be trained using a training dataset indicating events in which users charged electric vehicles subsequent to interacting with the EVCP dynamic layer and information associated with user interactions on the EVCP dynamic layer. The information may indicate: (i) a number of icons resembling locations of EVCUs/charging stations displayed on a user interface; (ii) a change in the number of icons over time; (iii) a frequency of which an icon of an EVCU/charging station was interacted with on a user interface over a period (e.g., a frequency of which the icon was clicked on or zoomed-in on the user interface for every minute or 30 seconds); (iv) a total amount of time spent by a user for exploring a certain EVCU/charging station; (v) attributes of an EVCU/charging station explored by a user (e.g., charge type, charging speed, price, current availability, predicted availability, etc.); (vi) a number of interactions (e.g., clicks, swipes, etc.) with an icon of an EVCU/charging station on a user interface; (vii) a total amount of time spent on the EVCP dynamic layer; or (viii) a combination thereof.

In one embodiment, the machine learning model for predicting whether or not a user will need to charge his/her vehicle when interacting with the EVCP dynamic layer may be a supervised machine learning classification model. In such embodiment, the information associated with user interactions on the EVCP dynamic layer are labeled as either an event in which a user charged his/her electric vehicle subsequent to interacting with the EVCP dynamic layer or an event in which a user did not charge his/her electric vehicles subsequent to interacting with the EVCP dynamic layer. In such embodiment, the machine learning model is trained using a classification algorithm, such as logistic regression, decision trees, random forests, support vector machines (SVM), neural networks, etc. Once the machine learning model is trained, the model may output target labels indicating whether or not a user will need to charge his/her vehicle when interacting with the EVCP dynamic layer as a function of input features indicating information corresponding to the information used to trained the machine learning model (e.g., a number of icons resembling locations of EVCUs/charging stations displayed on a user interface, a change in the number of icons over time, etc.). In one embodiment, input features may be associated with a region. For example, input features associated with a region may indicate that a user interface displayed a number of icons resembling locations of EVCUs/charging stations within the region, a user interface displayed a change in the number of icons over time within the region, etc. In such embodiment, if the machine learning model generates an output as a function of the input features, where the output indicates that the user will charge his/her vehicle when interacting with the EVCP dynamic layer, the prediction platform 115 may define the ideal location for deploying the EVCU 107 within the region as indicated in the input features.

In one embodiment, information associated with user interactions on the EVCP dynamic layer may be associated with a period (e.g., a period in which the user interactions on the EVCP dynamic layer have occurred). In such embodiment, historical data may be established to associate various periods with various information associated with user interactions on the EVCP dynamic layer. As such, when the prediction platform 115 receives a request for predicting whether a user will need to charge his/her when interacting with the EVCP dynamic layer at a certain period, the prediction platform 115 may refer to the historical data, identify information associated with user interactions on the EVCP dynamic layer corresponding to said period, and use the information as input to the machine learning model to render prediction of whether a user will need to charge his/her when interacting with the EVCP dynamic layer at said period.

In one embodiment, the prediction platform 115 may establish a threshold, and if the machine learning model outputs a number of predictions indicating that users need to charge their electric vehicles when interacting with the EVCP dynamic layer within a region satisfies the threshold (e.g., exceeds the threshold), the prediction platform 115 may define the ideal location for deploying the EVCU 107 within the region.

In one embodiment, the prediction of whether a user will need to charge his/her vehicle when interacting with the EVCP dynamic layer within a target region indicates the probability of which the EVCU 107 is required in the target region. For example, target labels indicating whether or not a user will need to charge his/her vehicle when interacting with the EVCP dynamic layer within a target region may be associated with confidence scores indicating the machine learning model's levels of certainty in its predictions. In such example, the confidence score associated with the target label indicating the user will need to charge his/her vehicle when interacting with the EVCP dynamic layer within the target region may be a probability of which the EVCU 107 is required at the target region. In one embodiment, said probability may be used for embodiments in which probabilities are assigned to subregions.

In one embodiment, the prediction platform 115 determines an ideal location for deploying the EVCU 107 based at least in part on user behaviors for charging electric vehicles. In such embodiment, the user behaviors for charging electric vehicles may be categorized as an opportunistic charging behavior or a desperate charging behavior. For example, an opportunistic charging behavior may define an event in which a user charges his/her electric vehicles when: (i) a state of charge the electric vehicle is above a threshold value (e.g., 20 percent); (ii) the electric vehicle is estimated to have a sufficient state of charge to reach the user's designated destination; or (iii) a combination thereof. In contrast, a desperate charging behavior may define an event in which a user charges his/her electric vehicles when: (i) a state of charge the electric vehicle is below a threshold value (e.g., 20 percent); (ii) the electric vehicle is estimated to have insufficient state of charge to reach the user's designated destination; or (iii) a combination thereof.

In one embodiment, the prediction platform 115 may use a machine learning model to predict whether an opportunistic charging behavior or a desperate charging behavior will be observed at a region. In such embodiment, the prediction platform 115 may select a location within the region as the ideal location for deploying the EVCU 107 if the machine learning model outputs a prediction indicating that a desperate charging behavior is likely to be observed at the region. In such embodiment, the machine learning model may be trained using a training dataset indicating events in which users charged electric vehicles and attributes associated with the events. The attributes may indicate, for each of the events: (i) a distance from a location in which a user's electric vehicle is charged to the user's destination; (ii) the user's electric vehicle speed; (iii) a state of charge of the user's electric vehicle prior to charging; (iv) whether the user's route is a route frequently traversed by the user or is a new route that hasn't been previously traversed by the user; (v) whether said event occurred on a specific epoch (e.g., a weekend or a weekday); (vi) a number of EVCUs/charging stations within a region in which the user's electric was charged; (vii) an average probability of which one or more EVCUs/charging stations within the region was available during said event; or (viii) a combination thereof.

In one embodiment, the machine learning model for predicting an opportunistic/desperate charging behavior may be a supervised machine learning classification model. In such embodiment, the attributes associated with the events are labeled as either an opportunistic charging behavior or a desperate charging behavior. In such embodiment, the machine learning model is trained using a classification algorithm, such as logistic regression, decision trees, random forests, support vector machines (SVM), neural networks, etc. Once the machine learning model is trained, the model may output target labels indicating whether an opportunistic charging behavior or a desperate charging behavior will be observed as a function of input features indicating attributes corresponding to the attributes used for training the machine learning model (e.g., a distance from a location in which a user's electric vehicle is charged to the user's destination, the user's electric vehicle speed, etc.). In one embodiment, input features may be associated with a region. For example, input features associated with a region may indicate that a distance from a location in which a user's electric vehicle is charged to the user's destination was recorded by the user's electric vehicle within the region, the user's electric vehicle speed was recorded by the user's electric vehicle within the region, etc. In such embodiment, if the machine learning model generates an output as a function of the input features, where the output indicates that a desperate charging behavior will be observed, the prediction platform 115 may define the ideal location for deploying the EVCU 107 within the region as indicated in the input features.

In one embodiment, the prediction of whether a desperate charging behavior or an opportunistic charging behavior will be observed within a target region indicates the probability of which the EVCU 107 is required in the target region. For example, target labels indicating whether a desperate charging behavior or an opportunistic charging behavior will be observed within a target region may be associated with confidence scores indicating the machine learning model's levels of certainty in its predictions. In such example, the confidence score associated with the target label indicating that a desperate charging behavior will be observed at the target region may be a probability of which the EVCU 107 is required at the target region. In one embodiment, said probability may be used for embodiments in which probabilities are assigned to subregions.

In one embodiment, the prediction of whether a desperate charging behavior or an opportunistic charging behavior will be observed may influence the maximum amount of charge permitted by the EVCU 107 for distributing power during a charging session. For example, if the prediction indicates that a desperate charging behavior will be observed at a target region, the prediction platform 115 may enable the EVCU 107 provide up to a first maximum amount of charge per charging session when the EVCU 107 is deployed within the target region, and if the prediction indicates that an opportunistic charging behavior will be observed at the target region, the prediction platform 115 may enable the EVCU 107 provide up to a second lesser maximum amount of charge per charging session when the EVCU 107 is deployed within the target region.

In one embodiment, the prediction platform 115 may provide data indicating whether creating a charging station within a region is optimal based on input data indicating usage of the EVCU 107 within the region. For example, the input data may indicate: (i) an occupancy rate indicating a duration of which the EVCU 107 is used by an electric vehicle (e.g., an average duration of which the EVCU 107 is used daily); (ii) a distance traversed by the EVCU 107 (e.g., a total distance traversed by the EVCU 107 when the EVCU 107 is used for providing power to electric vehicles and recharging its power supply); (iii) an average distance traversed by the EVCU 107 (e.g., an average distance traversed by the EVCU 107 over a period); (iv) consistency of occupancy rate and distance traversed over time; or (v) a combination thereof. The input data may be compared against sets of thresholds, where each of the set includes varying thresholds corresponding to output data. By way of example, the output data may indicate that: (i) there is a need for a charging station at a location; (ii) there is no need for a charging station at a location but an EVCU is still required at the location; or (iii) there is no need for an EVCP at the location. If the input data satisfy one of the sets of thresholds (e.g., values indicating the occupancy rate, the average duration, and the distance traversed by the EVCU are within ranges defined by a set of thresholds), then the output data corresponding to said one of the sets of thresholds are provided by the prediction platform 115. The data output by the prediction platform 115 may indicate a location that is optimal for installing a charging station, and such data may be used to install the charging station in said location to increase opportunities for providing power to electric vehicles.

In one embodiment, the prediction platform 115 may predict a duration for which an electric vehicle user is willing to charge at an EVCP. To render the prediction, the prediction platform 115 may use a machine learning model trained on a training dataset indicating events in which electric vehicle users used EVCPs to charge their vehicles and attributes associated with the events. The attributes may indicate, for each of the events, a duration for which an electric vehicle charged at an EVCP. The attributes may further indicate, for each of the events: (i) traffic congestion of a region of said event; (ii) an average number of electric vehicles within the region; (iii) a temperature level of the region; (iv) a humidity level of the region; (v) an epoch of said event (e.g., an hour in which the event occurred, whether the event occurred on a weekday or a weekend, whether the event occurred during a vacation or non-vacation season); (vi) a number of parking areas adjacent to a route of the electric vehicle; (vii) a mobility graph associated with the electric vehicle (e.g., whether the electric vehicle is traversing a new route or an old route previously traversed by the electric vehicle); (viii) an internet connection availability of the region; or (ix) a combination thereof.

In one embodiment, the machine learning model for predicting a duration for which an electric vehicle user is willing to charge at an EVCP may be a supervised machine learning regression model. In such embodiment, the machine learning model is trained using a regression algorithm, such as linear regression, decision trees, random forests, gradient boosting regressors, etc. Once the machine learning model is trained, the model may output a target variable indicating a duration for which an electric vehicle user is willing to charge at an EVCP as a function of input features indicating attributes corresponding to attributes used to train the machine learning model (e.g., a traffic congestion of a region, an average number of electric vehicles within the region, etc.). In one embodiment, the output of the machine learning model may be used as a part of a recommendation system that recommends a duration for which a user should charge his/her electric vehicle at the EVCP. In one embodiment, the prediction platform 115 may determine an ideal location for deploying the EVCU 107 based on predicted durations for which electric vehicle users are willing to charge at an EVCP. For example, it may be optimal to deploy the EVCU 107 in a location that enables the EVCU 107 to charge many electric vehicles while providing low-to-moderate amount of charge to each electric vehicle. In such example, the prediction platform 115 may provide a recommendation for deploying the EVCU 107 in a region associated with a high number of electric vehicle users that are predicted to charge their vehicles for a duration corresponding to the low-to-moderate amount of charge.

In one embodiment, the prediction platform 115 may predict a state of charge of the power supply 109 of the EVCU 107 based on predicted usage patterns at a given location and time. In such embodiment, the prediction platform 115 may incorporate a time series forecasting model to render the prediction. A time series forecasting model is a type of predictive model used to forecast future values based on past observations of a time-dependent variable. Time series data consists of observations recorded at regular time intervals, such as hourly, daily, monthly, or yearly. Time series forecasting models analyze patterns and trends in historical data to make predictions about future values of the time series. A time series forecasting model may be an Autoregressive Integrated Moving Average (ARIMA), Seasonal Decomposition of Time Series (STL), exponential smoothing methods (e.g., simple exponential smoothing (SES), double exponential smoothing (DES), and triple exponential smoothing (Holt-Winters)), Seasonal Autoregressive Integrated Moving Average (SARIMA), Long Short-Term Memory (LSTM) Networks, or Gaussian processes. To develop the model, historical data indicating states of charge of the power supply 109 of the EVCU 107 within a location over time may be used (alternatively, historical data indicating states of charge of a power supply of another EVCU within the same location over time may be used). For example, data indicating states of charge of the power supply 109 may be indexed by a plurality of timestamps with a predetermined interval (e.g., every 15 minutes) for each day and recorded for each of the plurality timestamps. The time series forecasting model is developed using such data, and the prediction platform 115 uses the model to output a predicted state of charge of the power supply 109 as a function of time. For example, the model may output a prediction indicating that "the state of charge of the EVCU is likely to be at 20 percent at 1 PM and empty after 4 PM." Applications that create trips and/or schedule charging sessions for electric vehicles in consideration of a current/predicted state of charge of electric vehicles may advantageously utilize the information output by the time series forecasting model to determine whether to incorporate a charging session at an EVCU as a part of the trips and/or the charging sessions.

In one embodiment, the prediction platform 115 may predict a probability of which a vehicle encounters one or more EVCUs while traversing one or more road segments. In such embodiment, the prediction platform 115 may be trained based on a training dataset indicating events in which vehicles encountered EVCUs or did not encounter EVCUs while traversing one or more road segments and attributes associated with said events. The attributes may indicate, for each of the events: (i) a functional class of a road segment in which an EVCU was observed; (ii) a congestion level of the road segment; (iii) an average number of electric vehicles within a region in which the EVCU was observed; (iv) a temperature level of the region in which the EVCU was observed; (v) a humidity level of the region in which the EVCU was observed; (vi) an epoch in which the EVCU was observed (e.g., whether the EVCU was observed on a weekday or a weekend); (vii) a number of parking areas adjacent to a route of the vehicle; or (viii) a combination thereof.

In one embodiment, the machine learning model for determining a probability of which a vehicle encounters one or more EVCUs while traversing one or more road segments may be a supervised machine learning classification model. In such embodiment, the attributes associated with each of the events are labeled as either an event in which a vehicle encountered at least one EVCU while traversing one or more road segments or an event in which a vehicle did not encounter any EVCUs while traversing one or more road segments. In such embodiment, the machine learning model is trained using a classification algorithm, such as logistic regression, decision trees, random forests, support vector machines (SVM), neural networks, etc. Once the machine learning model is trained, the model may output target labels indicating whether or not a vehicle will encounter one or more EVCUs while traversing one or more road segments as a function of input features indicating attributes corresponding to the attributes used to train the machine learning model (e.g., a functional class of the one or more road segments, the congestion level of the one or more road segments, etc.). In one embodiment, the target labels may be associated with confidence scores indicating the machine learning model's levels of certainty in its predictions. In such embodiment, the confidence score associated with the target label indicating that a vehicle will encounter one or more EVCUs while traversing one or more road segments may be the probability of which the vehicle encounters one or more EVCUs while traversing the one or more road segments.

In one embodiment, the prediction platform 115 may generate and recommend a route for an electric vehicle user based on a probability of which the user's electric vehicle encounters one or more EVCUs while traversing the route. In one embodiment, the route may be generated such that one or more road segments or a specific road segment within the route is associated with a high probability of which the user's electric vehicle will encounter one or more EVCUs.

Outputs of the prediction platform 115 in accordance with the aforementioned embodiments may be used for various vehicle-related applications, namely, applications related to providing charging sessions via EVCUs. For example, outputs of the prediction platform 115 related to ideal locations for deploying EVCUs may be presented on a user interface or used as navigation instructions for the EVCUs to traverse to the ideal locations (e.g., guided routes to the ideal locations). By way of another example, maneuverability of EVCUs may be at least semi-autonomous, and outputs of the prediction platform 115 related to ideal locations for deploying the EVCUs may be instructions for autonomously maneuvering the EVCUs to the ideal locations.

The prediction platform 115 can be implemented in hardware, firmware, software, or a combination thereof. Though depicted as an individual entity in FIG. 1, it is contemplated that the prediction platform 115 may be implemented for direct operation the UE 111, one or more of the content providers 121, the services platform 123, an entity that is not illustrated within the system 100 but includes components capable of supporting the prediction platform 115 (e.g., a computing system of a hardware device), or a combination thereof. In one embodiment, the prediction platform 115 may generate direct signal inputs by way of operating systems of one or more of the content providers 121, the services platform 123, another entity, or a combination thereof for interacting with the applications 113. The various executions presented herein contemplate arrangements and models.

In the illustrated embodiment, the database 117 stores information on road links (e.g., road length, road breadth, slope information, curvature information, geographic attributes, etc.), probe data for one or more road links (e.g., traffic density information), points-of-interest (POIs), and other types map-related features. In one embodiment, the database 117 may include any multiple types of information that can facilitate provision of EVCUs to electric vehicles. It should be appreciated that the information stored in the database 117 may be acquired from any of the elements within the system 100, other vehicles, sensors, database, or a combination thereof.

In the illustrated embodiment, the vehicle 101, the EVCU 107, the UE 111, the prediction platform 115, the detection entity 119, the content providers 121, and the services platform 123 communicate with each other and other components of the communication network 127 using well known, new or still developing protocols. In this context, a protocol includes a set of rules defining how the network nodes within the communication network 127 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically affected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 4:
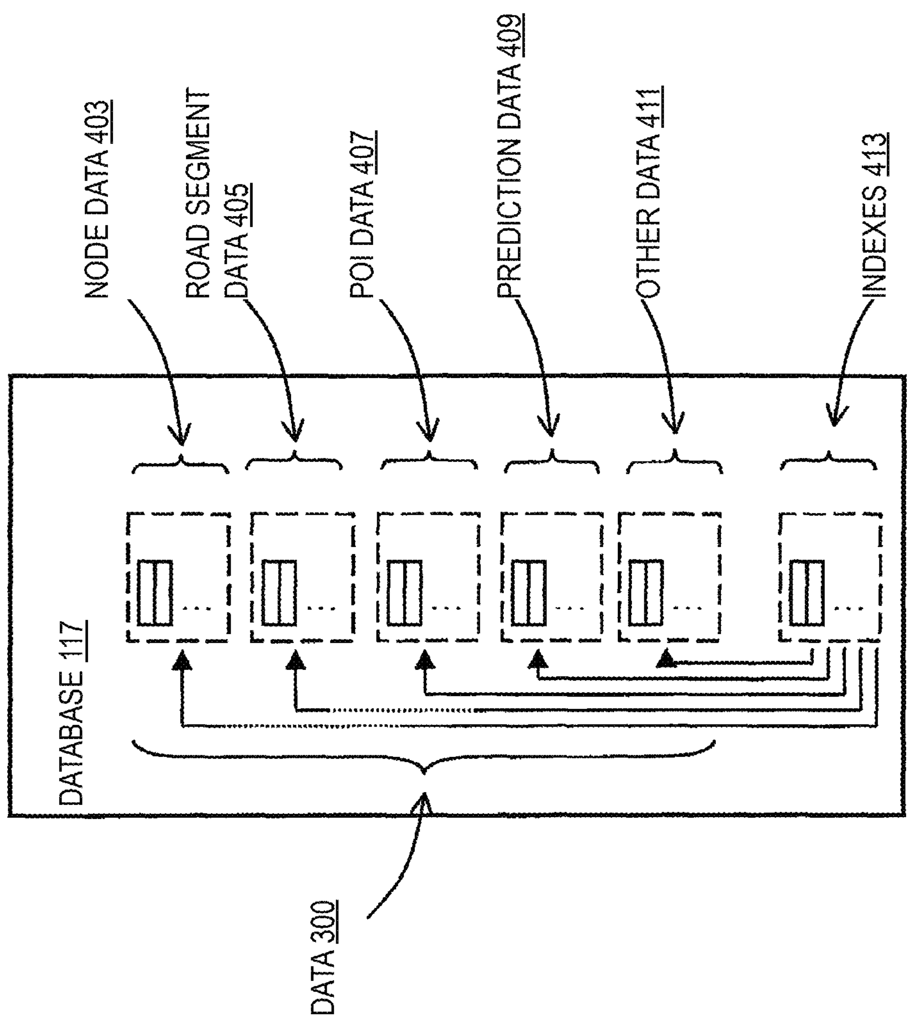
FIG. 4 illustrates a diagram of a dataset of FIG. 1, according to one embodiment.

FIG. 4 illustrates a diagram of the database 117, according to one embodiment. In one embodiment, the database 117 includes data 400 used for (or configured to be compiled to be used for) mapping and/or navigation-related services, such as for route generation or EVCP recommendations. In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the database 117.

"Node"—A point that terminates a link.

"Line segment"—A line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the database 117 follows certain conventions. For example, links do not cross themselves and do not cross each other except at a node or vertex. Also, there are no duplicated shape points, nodes, or links. Two links that connect each other have a common node or vertex. In the database 117, overlapping geographic features are represented by overlapping polygons. When polygons overlap, the boundary of one polygon crosses the boundary of the other polygon. In the database 117, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

In one embodiment, the database 117 is presented according to a hierarchical or multi-level tile projection. More specifically, in one embodiment, the database 117 may be defined according to a normalized Mercator projection. Other projections may be used. In one embodiment, a map tile grid of a Mercator or similar projection can a multilevel grid. Each cell or tile in a level of the map tile grid is divisible into the same number of tiles of that same level of grid. In other words, the initial level of the map tile grid (e.g., a level at the lowest zoom level) is divisible into four cells or rectangles. Each of those cells are in turn divisible into four cells, and so on until the highest zoom level of the projection is reached.

In one embodiment, the map tile grid may be numbered in a systematic fashion to define a tile identifier (tile ID). For example, the top left tile may be numbered 00, the top right tile may be numbered 01, the bottom left tile may be numbered 10, and the bottom right tile may be numbered 11. In one embodiment, each cell is divided into four rectangles and numbered by concatenating the parent tile ID and the new tile position. A variety of numbering schemes also is possible. Any number of levels with increasingly smaller geographic areas may represent the map tile grid. Any level (n) of the map tile grid has 2(n+1) cells. Accordingly, any tile of the level (n) has a geographic area of A/2(n+1) where A is the total geographic area of the world or the total area of the map tile grids. Because of the numbering system, the exact position of any tile in any level of the map tile grid or projection may be uniquely determined from the tile ID.

As shown, the database 117 includes node data 403, road segment or link data 405, POI data 407, prediction data 409, other data 411, and indexes 413, for example. More, fewer, or different data can be provided. In one embodiment, additional data (not shown) can include cartographic ("carto") data records, routing data, and maneuver data. In one embodiment, the indexes 413 may improve the speed of data retrieval operations in the database 117. In one embodiment, the indexes 413 may be used to quickly locate data without having to search every row in the database 117 every time it is accessed. For example, in one embodiment, the indexes 413 can be a spatial index of the polygon points associated with stored feature polygons.

In exemplary embodiments, the road segment data records 405 are links or segments representing roads, streets, or paths, as can be used in the calculated route or recorded route information for determination of one or more personalized routes. The node data records 403 are end points (such as intersections) corresponding to the respective links or segments of the road segment data records 405. The road segment data records 405 and the node data records 403 represent a road network, such as used by vehicles, cars, and/or other entities. Alternatively, the database 117 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The database 117 can include data about the POIs and their respective locations in the POI data records 407. The database 117 can also include data about places, such as cities, towns, or other communities, and other geographic features, such as bodies of water, mountain ranges, etc. Such place or feature data can be part of the POI data records 407 or can be associated with POIs or POI data records 407 (such as a data point used for displaying or representing a position of a city).

The prediction data 409 may include historical data and/or training datasets for training machine learning models employed by the prediction platform 115, inputs and outputs of the machine learning models, and map-related data including location data associated with the inputs and outputs of the machine learning models. For example, the map-related data may include map layers of ideal locations for deploying EVCUs. Said map layers may be used in conjunction with other map layers that cover the same geographical regions as said map layers but represent different attributes associated with said regions.

Other data 411 may include data/instructions for executing applications based on the output of the prediction platform 115. For example, the applications include causing a user interface to display a route to an EVCU, a route for an EVCU, a route to a location that may possibly include an EVCU, a duration for which an electric vehicle user is willing to charge at an EVCU, a predicted state of charge of an EVCU, etc. The applications may further include commands/instructions that cause an autonomous vehicle to autonomously traverse a route to an EVCU or cause an autonomous vehicle that is an EVCU to autonomously traverse to a designated location, etc. Other applications include enabling an EVCU to provide access for an electric vehicle user to charge his/her electric vehicle at the EVCU and causing the EVCU to provide a designated amount of charge for said electric vehicle. Other data 411 may also include data that may be used as inputs for the prediction platform 115. For example, real-time data, such as a congestion level of a region, may be stored as a part of the data 411, and used as input data for the machine learning model trained to predict an ideal location for deploying an EVCU. Other data 411 may also include data indicating attributes of EVCUs, such as estimated ranges of the EVCUs, the state of charge of the EVCUs, queues for using the EVCUs, etc.

In one embodiment, the database 117 can be maintained by the services platform 115 and/or one or more of the content providers 121 in association with a map developer. The map developer can collect geographic data to generate and enhance the database 117. There can be different ways used by the map developer to collect data. These ways can include obtaining data from other sources, such as municipalities or respective geographic authorities. In addition, the map developer can employ field personnel to travel by vehicle along roads throughout the geographic region to observe attributes associated with one or more road segments and/or record information about them, for example. Also, remote sensing, such as aerial or satellite photography, can be used.

The database 117 can be a master database stored in a format that facilitates updating, maintenance, and development. For example, the master database or data in the master database can be in an Oracle spatial format or other spatial format (e.g., accommodating different map layers), such as for development or production purposes. The Oracle spatial format or development/production database can be compiled into a delivery format, such as a geographic data files (GDF) format. The data in the production and/or delivery formats can be compiled or further compiled to form database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by the UE 111 or the vehicle 101, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received database in a delivery format to produce one or more compiled navigation databases.

The processes described herein for providing predicted tire temperature levels may be advantageously implemented via software, hardware (e.g., general processor, Digital Signal Processing (DSP) chip, an Application Specific Integrated Circuit (ASIC), Field Programmable Gate Arrays (FPGAs), etc.), firmware, or a combination thereof.

Figure 14:
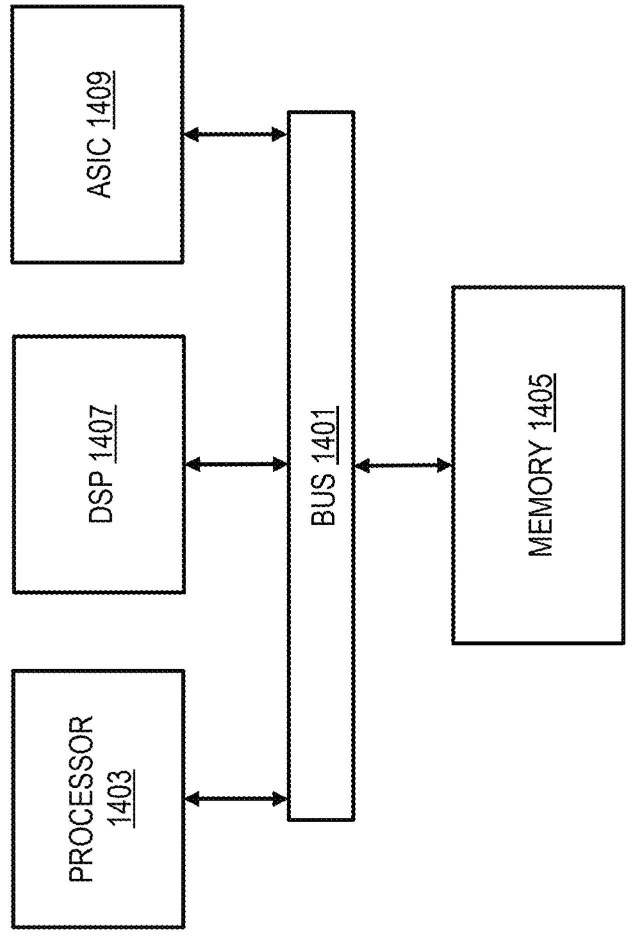
FIG. 14 illustrates a chip set upon which an embodiment of the invention may be implemented.

FIG. 5 illustrates a flowchart of a process 500 for determining a location for deploying an EVCU, according to one example embodiment. In various embodiments, the prediction platform 115 may perform one or more portions of the process 500 and may be implemented in, for instance, a chip set including a processor and a memory as shown in FIG. 14 or in circuitry, hardware, firmware, software, or in any combination thereof. As such, the prediction platform 115 can provide means for accomplishing various parts of the process 500, as well as means for accomplishing embodiments of other processes described herein in conjunction with other components of the system 100. Although the process 500 is illustrated and described as a sequence of steps, it is contemplated that various embodiments of the process 500 may be performed in any order or combination and need not include all of the illustrated steps.

In step 501, the prediction platform 115 may estimate a range of an EVCU. The range indicates the maximum range at which the EVCU is capable of traversing from its current position based on the current condition of the EVCU (e.g., the current fuel level, state of charge, etc.). In an alternative embodiment, a different entity estimates the range of the EVCU (e.g., the computing system within the EVCU, the content providers 121, the services platform 123, etc.), and the prediction platform 115 acquires information indicating the range of the EVCU.

In step 503, the prediction platform 115 determines a zone based on the range of the EVCU. The zone is defined such that the current location of the EVCU is in the center of the zone, and the range of the EVCU exceeds a distance from the current location to the outermost boundary of the zone. The distance from the current location to the outermost boundary of the zone is defined as being less than the range of the EVCU to ensure that the EVCU can reach any vehicle-accessible locations within the zone. In one embodiment, a geometric shape of a zone is dependent on a shape of an individual granular unit resembling a portion of a map. For example, map data are typically represented as tiles, where each tile is a square boundary representing a geographical region and is defined at a certain resolution, and a combination of tiles may be in a form of a larger square that encompasses a greater geographical region.

In step 505, the prediction platform 115 divides the zone into a plurality of subregions. In one embodiment, each of the plurality of subregions is a tile of a tile map. In one embodiment, each of the plurality of subregions 207 may have a resolution of 126.58 $m^2$ or less.

In step 507, the prediction platform 115 outputs a probability of which the EVCU is required at each of the plurality of subregions. The prediction platform 115 employs a machine learning model to output the probability for a subregion based at least in part on attributes associated with said subregion. Details of how the machine learning model is trained and outputs the probability will be described with reference to FIG. 6.

In step 509, the prediction platform 115 generates one or more clusters within the zone. Each of the one or more clusters includes one or more of the plurality of subregions. A clustering model is a type of unsupervised machine learning model used to group similar data points together based on their inherent characteristics or features. The goal of clustering is to find natural groupings or clusters in the data without any prior knowledge of the groupings. In a clustering model, the algorithm automatically partitions the data into clusters such that data points within the same cluster are more similar to each other compared to data points in different clusters. In one embodiment, the clustering model may be a K-means clustering model.

In step 511, the prediction platform 115 calculates a value for each of the one or more clusters. In one embodiment, the prediction platform 115 calculates a mean value of all probabilities of all subregions in each of the one or more clusters. As such, each of the one or more clusters is assigned with a mean value.

In step 513, the prediction platform 115 selects one of the one or more clusters based on the value. In one embodiment, the prediction platform 115 selects a cluster among the one or more clusters that has the greatest mean value among the one or more clusters.

In step 515, the prediction platform 115 assigns a location within the selected cluster for deploying the EVCU. In one embodiment, the prediction platform 115 calculates a centroid of the selected cluster, and a subregion of the selected cluster that corresponds to the centroid is selected as the location for deploying the EVCU. In one embodiment, the prediction platform 115 identifies a parking location within said subregion as the location for deploying the EVCU 107. Information indicating the location for deploying the EVCU, such as a route to the EVCU, may be output at a user interface of the EVCU such that a driver of the EVCU may use the information to navigate to the location. The information may also be available on the application 113 such that a user of the electric vehicle 101 may access the information on the application 113 via the UE 111 and use the information to traverse to the location and use the EVCU. In one embodiment, the EVCU may be an autonomous vehicle, and the information may be used to generate autonomous vehicle maneuver instructions that can cause the EVCU to autonomously traverse to the location.

FIG. 6 illustrates a flowchart of a process 600 for training a machine learning model for determining a probability of which an EVCU is required at a region based on one or more attributes of the region, according to one example embodiment. In various embodiments, the prediction platform 115 may perform one or more portions of the process 600 and may be implemented in, for instance, a chip set including a processor and a memory as shown in FIG. 14 or in circuitry, hardware, firmware, software, or in any combination thereof. As such, the prediction platform 115 can provide means for accomplishing various parts of the process 600, as well as means for accomplishing embodiments of other processes described herein in conjunction with other components of the system 100. Although the process 600 is illustrated and described as a sequence of steps, it is contemplated that various embodiments of the process 600 may be performed in any order or combination and need not include all of the illustrated steps.

In step 601, the prediction platform 115 receives a training dataset for training a machine learning model for outputting a probability of which an EVCU is required at a region. The training dataset may indicate events in which electric vehicles had less than a predetermined amount of state of charge. For example, the predetermined amount of state charge may be 20 percent. It should be appreciated, however, that the predetermined amount may be any value less than 50 percent. Information associated with the events may indicate attributes associated with said events and regions in which said events have occurred. Specifically, the information indicates, for each of the electric vehicles that had less than the predetermined amount of state of charge, one or more attributes associated with a region in which said electric vehicle was located while having the state of charge less than the predetermined amount. The one or more attributes indicate: (i) an average number of electric vehicles within the region; (ii) one or more lengths of one or more functional classes of one or more road segments within the region; (iii) a vehicle density of the region; (iv) a vehicle congestion level of the region; (v) a weather condition of the region; (vi) a number of electric vehicle charging stations within the region; (vii) demographic information (e.g., a male to female ratio, education level, etc.); or (viii) a combination thereof. In one embodiment, the machine learning model may be a classification task, and the training dataset includes attributes of regions, where attributes of each of the regions are labeled as either a region that included an electric vehicle having less than the predetermined state of charge or a region that did not include any electric vehicle having less than the predetermined state of charge.

In step 603, the prediction platform 115 trains the machine learning model based on the training dataset. In one embodiment, the machine learning model may be a supervised machine learning model that is a classification task. The machine learning model may be trained using a classification algorithm, such as logistic regression, decision trees, random forests, support vector machines (SVM), neural networks, etc.

In step 605, the machine learning model is trained, and the prediction platform 115 receives input data indicating one or more attributes of a target region. The one or more attributes correspond to the attributes used to train the machine learning model (e.g., an average number of electric vehicles within the target region, one or more lengths of one or more functional classes of one or more road segments within the target region, etc.). In one embodiment, the input data may be provided by one or more detection entities 119 within the target region (e.g., one or more sensors within the target region), the database 117, one or more of the content providers 121, the services platform 123, or a combination thereof.

In step 607, the prediction platform 115 causes the machine learning model to output the probability of which an EVCU is required at a target region as a function of the input data. The one or more attributes of the target region is provided as one or more input features, and the machine learning model renders an output based on the one or more input features. The machine learning model may output target labels indicating whether or not the target region includes an electric vehicle having less than the predetermined state of charge as a function of the input features. The target labels may be associated with confidence scores indicating the machine learning model's levels of certainty in its predictions. The confidence score associated with the target label indicating that the target region includes an electric vehicle having less than the predetermined state of charge may be the probability of which the EVCU is required at the target region.

FIG. 7 illustrates a flowchart of a process 700 for determining a location for deploying an EVCU based at least in part on user interactions of a dynamic EVCP layer, according to one example embodiment. In various embodiments, the prediction platform 115 may perform one or more portions of the process 700 and may be implemented in, for instance, a chip set including a processor and a memory as shown in FIG. 14 or in circuitry, hardware, firmware, software, or in any combination thereof. As such, the prediction platform 115 can provide means for accomplishing various parts of the process 700, as well as means for accomplishing embodiments of other processes described herein in conjunction with other components of the system 100. Although the process 700 is illustrated and described as a sequence of steps, it is contemplated that various embodiments of the process 700 may be performed in any order or combination and need not include all of the illustrated steps.

In step 701, the prediction platform 115 receives a training dataset indicating events in which users charged electric vehicles subsequent to interacting with the EVCP dynamic layer and information associated with user interactions on the EVCP dynamic layer. The information may indicate: (i) a number of icons resembling locations of EVCUs/charging stations displayed on a user interface; (ii) a change in the number of icons over time; (iii) a frequency of which an icon of an EVCU/charging station was interacted with on a user interface over a period (e.g., a frequency of which the icon was clicked on or zoomed-in on the user interface for every minute or 30 seconds); (iv) a total amount of time spent by a user for exploring a certain EVCU/charging station; (v) attributes of an EVCU/charging station explored by a user (e.g., charge type, charging speed, price, current availability, predicted availability, etc.); (vi) a number of interactions (e.g., clicks, swipes, etc.) with an icon of an EVCU/charging station on a user interface; (vii) a total amount of time spent on the EVCP dynamic layer; or (viii) a combination thereof.

In step 703, the prediction platform 115 trains a machine learning model for predicting whether or not a user will need to charge his/her vehicle when interacting with the EVCP dynamic layer based on the training dataset. In one embodiment, the machine learning model may be a supervised machine learning classification model. In such embodiment, the information associated with user interactions on the EVCP dynamic layer are labeled as either an event in which a user charged his/her electric vehicle subsequent to interacting with the EVCP dynamic layer or an event in which a user did not charge his/her electric vehicles subsequent to interacting with the EVCP dynamic layer. In such embodiment, the machine learning model is trained using a classification algorithm, such as logistic regression, decision trees, random forests, support vector machines (SVM), neural networks, etc.

In step 705, the machine learning model is trained, and the prediction platform 115 may receive input data indicating information associated with user interactions on the EVCP dynamic layer. The input data may be input features indicating information corresponding to the information used to trained the machine learning model (e.g., a number of icons resembling locations of EVCUs/charging stations displayed on a user interface, a change in the number of icons over time, etc.).

In step 707, the prediction platform 115 causes the machine learning model to predict whether a user will charge the user's electric vehicle when interacting with the EVCP dynamic layer as a function of the input data. The machine learning model may output target labels indicating whether or not the user will need to charge the user's electric vehicle when interacting with the EVCP dynamic layer as a function of the input features.

In step 709, the prediction platform 115 determines a location for deploying the EVCU based on the prediction output by the machine learning model. Input features may be associated with a region. For example, input features associated with a region may indicate that a user interface displayed a number of icons resembling locations of EVCUs/charging stations within the region, a user interface displayed a change in the number of icons over time within the region, etc. If the machine learning model generates an output as a function of the input features, where the output indicates that a user will charge the user's electric vehicle when interacting with the EVCP dynamic layer within a region, the prediction platform 115 may define the location for deploying the EVCU within the region as indicated in the input features.

FIG. 8 illustrates a flowchart of a process 800 for determining a location for deploying an EVCU based at least in part on user behaviors for charging electric vehicles, according to one example embodiment. In various embodiments, the prediction platform 115 may perform one or more portions of the process 800 and may be implemented in, for instance, a chip set including a processor and a memory as shown in FIG. 14 or in circuitry, hardware, firmware, software, or in any combination thereof. As such, the prediction platform 115 can provide means for accomplishing various parts of the process 800, as well as means for accomplishing embodiments of other processes described herein in conjunction with other components of the system 100. Although the process 800 is illustrated and described as a sequence of steps, it is contemplated that various embodiments of the process 800 may be performed in any order or combination and need not include all of the illustrated steps.

In step 801, the prediction platform 115 receives a training dataset indicating events in which users charged electric vehicles and attributes associated with the events. The attributes may indicate, for each of the events: (i) a distance from a location in which a user's electric vehicle is charged to the user's destination; (ii) the user's electric vehicle speed; (iii) a state of charge of the user's electric vehicle prior to charging; (iv) whether the user's route is a route frequently traversed by the user or is a new route that hasn't been previously traversed by the user; (v) whether said event occurred on a specific epoch (e.g., a weekend or a weekday); (vi) a number of EVCUs/charging stations within a region in which the user's electric was charged; (vii) an average probability of which one or more EVCUs/charging stations within the region was available during said event; or (viii) a combination thereof.

In step 803, the prediction platform 115 trains a machine learning model for predicting an opportunistic/desperate charging behavior based on the training dataset. An opportunistic charging behavior may define an event in which a user charges his/her electric vehicles when: (i) a state of charge the electric vehicle is above a threshold value (e.g., 20 percent); (ii) the electric vehicle is estimated to have a sufficient state of charge to reach the user's designated destination; or (iii) a combination thereof. In contrast, a desperate charging behavior may define an event in which a user charges his/her electric vehicles when: (i) a state of charge the electric vehicle is below a threshold value (e.g., 20 percent); (ii) the electric vehicle is estimated to have insufficient state of charge to reach the user's designated destination; or (iii) a combination thereof. In one embodiment, the machine learning model may be a supervised machine learning classification model. In one embodiment, the attributes associated with the events, as indicated in the training dataset, are labeled as either an opportunistic charging behavior or a desperate charging behavior. In such embodiment, the machine learning model is trained using a classification algorithm, such as logistic regression, decision trees, random forests, support vector machines (SVM), neural networks, etc.

In step 805, the machine learning model is trained, and the prediction platform 115 receives input data indicating attributes corresponding to the attributes used for training the machine learning model (e.g., a distance from a location in which a user's electric vehicle is charged to the user's destination, the user's electric vehicle speed, etc.).

In step 807, the prediction platform 115 causes the machine learning model to predict an opportunistic/desperate charging behavior as a function of the input data. The machine learning model may output target labels indicating whether an opportunistic charging behavior or a desperate charging behavior will be observed as a function of input features indicating attributes corresponding to the attributes used for training the machine learning model (e.g., a distance from a location in which a user's electric vehicle is charged to the user's destination, the user's electric vehicle speed, etc.).

In step 809, the prediction platform 115 determines a location for deploying an EVCU based on the prediction output by the machine learning model. Input features may be associated with a region. For example, input features associated with a region may indicate that a distance from a location in which a user's electric vehicle is charged to the user's destination was recorded by the user's electric vehicle within the region, the user's electric vehicle speed was recorded by the user's electric vehicle within the region, etc. If the machine learning model generates an output as a function of the input features, where the output indicates that a desperate charging behavior will be observed, the prediction platform 115 may define the ideal location for deploying the EVCU within the region as indicated in the input features.

Figure 9:
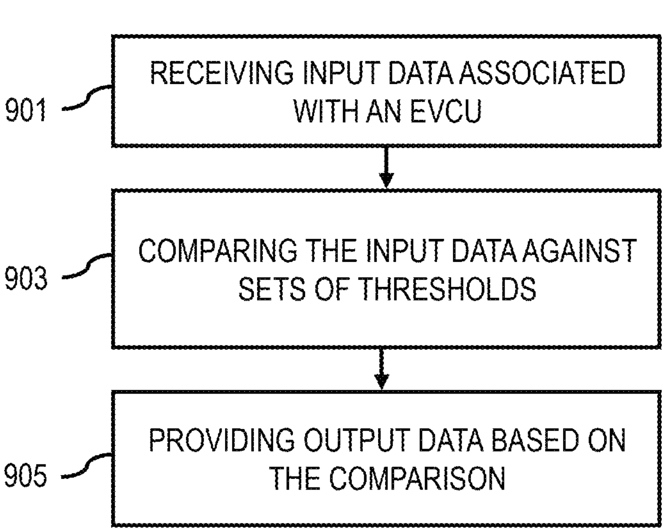
FIG. 9 illustrates a flowchart of a process for determining a location for installing a charging station based on data associated with an EVCU, according to one example embodiment.

FIG. 9 illustrates a flowchart of a process 900 for determining a location for installing a charging station based on data associated with an EVCU, according to one example embodiment. In various embodiments, the prediction platform 115 may perform one or more portions of the process 900 and may be implemented in, for instance, a chip set including a processor and a memory as shown in FIG. 14 or in circuitry, hardware, firmware, software, or in any combination thereof. As such, the prediction platform 115 can provide means for accomplishing various parts of the process 900, as well as means for accomplishing embodiments of other processes described herein in conjunction with other components of the system 100. Although the process 900 is illustrated and described as a sequence of steps, it is contemplated that various embodiments of the process 900 may be performed in any order or combination and need not include all of the illustrated steps.

In step 901, the prediction platform 115 receives input data associated with an EVCU. The input data may indicate usage of the EVCU within a region. Additionally, the input data may indicate: (i) an occupancy rate indicating a duration of which an EVCU is used by an electric vehicle (e.g., an average duration of which the EVCU is used daily); (ii) a distance traversed by the EVCU (e.g., a total distance traversed by the EVCU when the EVCU is used for providing power to electric vehicles and recharging its power supply); (iii) an average distance traversed by the EVCU (e.g., an average distance traversed by the EVCU over a period); (iv) consistency of occupancy rate and distance traversed over time; or (v) a combination thereof.

In step 903, the prediction platform 115 compares the input data against sets of thresholds. Each of the sets includes varying thresholds that correspond to output data. By way of example, the output data may indicate that: (i) there is a need for a charging station at a location; (ii) there is no need for a charging station at a location but an EVCU is still required at the location; or (iii) there is no need for an EVCP at the location.

In step 905, the prediction platform 115 provides output data based on the comparison. Specifically, if the input data satisfy one of the sets of thresholds (e.g., values indicating the occupancy rate, the average duration, and the distance traversed by the EVCU are within ranges defined by a set of thresholds), then the output data corresponding to said one of the sets of thresholds are provided by the prediction platform 115. The data output by the prediction platform 115 may indicate a location that is optimal for installing a charging station.

FIG. 10 illustrates a flowchart of a process 1000 for predicting a duration for which an electric vehicle user is willing to charge at an EVCP and providing an application based on the prediction, according to one example embodiment. In various embodiments, the prediction platform 115 may perform one or more portions of the process 1000 and may be implemented in, for instance, a chip set including a processor and a memory as shown in FIG. 14 or in circuitry, hardware, firmware, software, or in any combination thereof. As such, the prediction platform 115 can provide means for accomplishing various parts of the process 1000, as well as means for accomplishing embodiments of other processes described herein in conjunction with other components of the system 100. Although the process 1000 is illustrated and described as a sequence of steps, it is contemplated that various embodiments of the process 1000 may be performed in any order or combination and need not include all of the illustrated steps.

In step 1001, the prediction platform 115 receives a training dataset indicating events in which electric vehicle users used EVCPs to charge their vehicles and attributes associated with the events. The attributes may indicate, for each of the events, a duration for which an electric vehicle charged at an EVCP. The attributes may further indicate, for each of the events: (i) traffic congestion of a region of said event; (ii) an average number of electric vehicles within the region; (iii) a temperature level of the region; (iv) a humidity level of the region; (v) an epoch of said event (e.g., an hour in which the event occurred, whether the event occurred on a weekday or a weekend, whether the event occurred during a vacation or non-vacation season); (vi) a number of parking areas adjacent to a route of the electric vehicle; (vii) a mobility graph associated with the electric vehicle (e.g., whether the electric vehicle is traversing a new route or an old route previously traversed by the electric vehicle); (viii) an internet connection availability of the region; or (ix) a combination thereof.

In step 1003, the prediction platform 115 trains a machine learning model based on the training dataset. In one embodiment, the machine learning model may be a supervised machine learning regression model. In such embodiment, the machine learning model is trained using a regression algorithm, such as linear regression, decision trees, random forests, gradient boosting regressors, etc.

In step 1005, the machine learning model is trained, and the prediction platform 115 receives input data indicating attributes of a region. The attributes associated with the region correspond to the training dataset. For example, the attributes may indicate a traffic congestion of the region, an average number of electric vehicles within the region, a temperature level of the region, etc.

In step 1007, the prediction platform 115 causes the machine learning model to predict a duration for which an electric vehicle user is willing to charge at an EVCP as a function of the input data. Specifically, the machine learning model may output a target variable indicating a duration for which an electric vehicle user is willing to charge at the EVCP as a function of input features indicating the attributes.

In step 1009, the prediction platform 115 provides an application based on the output of the machine learning model. In one example application, the output of the machine learning model may be used as a part of a recommendation system that recommends a duration for which a user should charge his/her electric vehicle at the EVCP. In another example application, the prediction platform 115 may determine an ideal location for deploying an EVCU based on predicted durations for which electric vehicle users are willing to charge at an EVCU. For example, it may be optimal to deploy an EVCU in a location that enables the EVCU to charge many electric vehicles while providing low-to-moderate amount of charge to each electric vehicle. In such example, the prediction platform 115 may provide a recommendation for deploying the EVCU in a region associated with a high number of electric vehicle users that are predicted to charge their vehicles for a duration corresponding to the low-to-moderate amount of charge.

Figure 11:
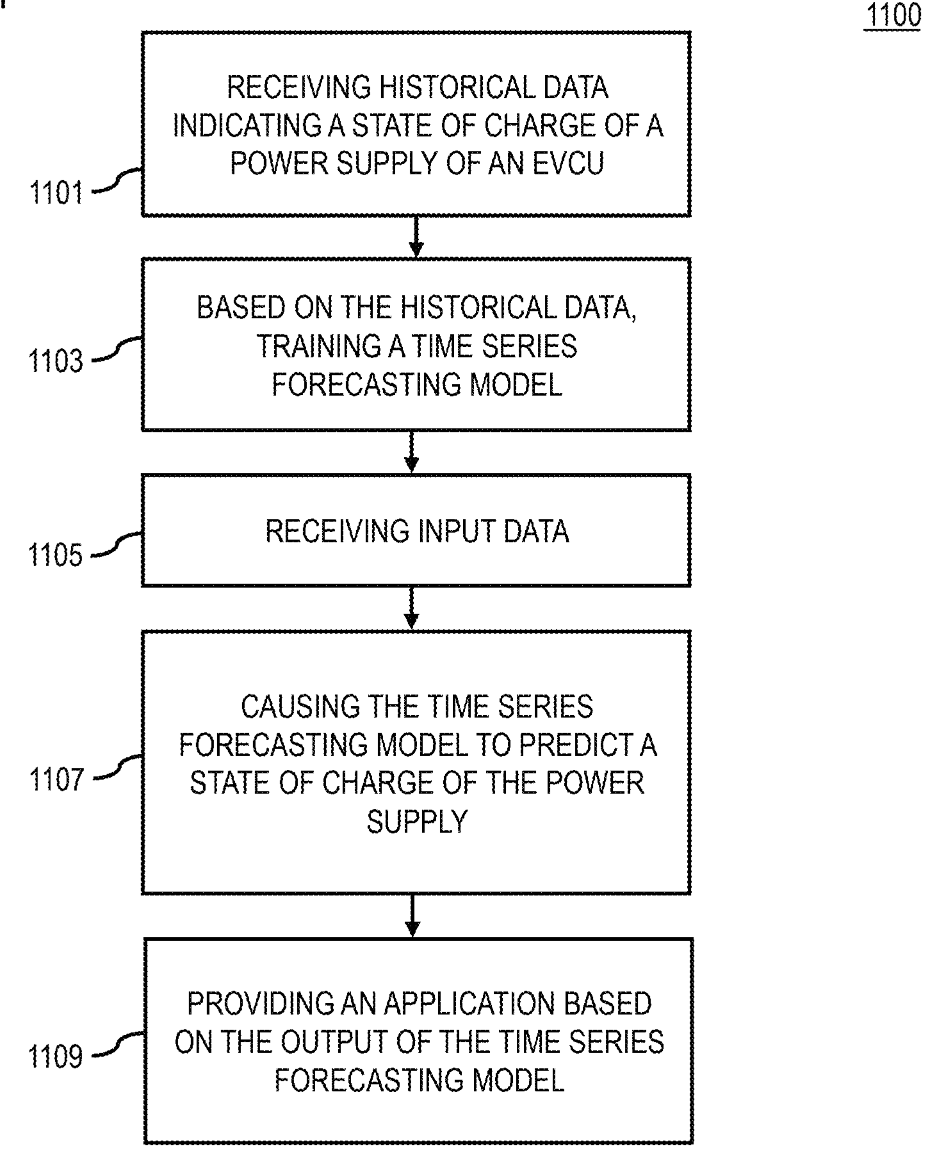
FIG. 11 illustrates a flowchart of a process for predicting a state of charge of a power supply of an EVCU based on predicted usage patterns at a given location and time and providing an application based on the prediction.

FIG. 11 illustrates a flowchart of a process 1100 for predicting a state of charge of a power supply of an EVCU based on predicted usage patterns at a given location and time and providing an application based on the prediction, according to one example embodiment. In various embodiments, the prediction platform 115 may perform one or more portions of the process 1100 and may be implemented in, for instance, a chip set including a processor and a memory as shown in FIG. 14 or in circuitry, hardware, firmware, software, or in any combination thereof. As such, the prediction platform 115 can provide means for accomplishing various parts of the process 1100, as well as means for accomplishing embodiments of other processes described herein in conjunction with other components of the system 100. Although the process 1100 is illustrated and described as a sequence of steps, it is contemplated that various embodiments of the process 1100 may be performed in any order or combination and need not include all of the illustrated steps.

In step 1101, the prediction platform 115 receives historical data indicating a state of charge of a power supply of an EVCU within a location over time. Data indicating states of charge of the power supply may be indexed by a plurality of timestamps with a predetermined interval (e.g., every 15 minutes) for each day and recorded for each of the plurality timestamps.

In step 1103, the prediction platform 115 trains a time series forecasting model as a function of the historical data. The time series forecasting model may be an Autoregressive Integrated Moving Average (ARIMA), Seasonal Decomposition of Time Series (STL), exponential smoothing methods (e.g., simple exponential smoothing (SES), double exponential smoothing (DES), and triple exponential smoothing (Holt-Winters)), Seasonal Autoregressive Integrated Moving Average (SARIMA), Long Short-Term Memory (LSTM) Networks, or Gaussian processes.

In step 1105, the prediction platform 115 receives input data indicating a time or a period. The input data may be a request indicating a time or period for which a prediction of the state of charge of the power supply of the EVCU should be rendered for.

In step 1107, the prediction platform 115 causes the time series forecasting model to predict a state of charge of the power supply of the EVCU based on the input data. For example, a user may wish to know predicted states of charge at 1 PM and after 4 PM. In such example, the model may output a prediction indicating that "the state of charge of the EVCU is likely to be at 20 percent at 1 PM and empty after 4 PM."

In step 1109, the prediction platform 115 provides an application based on the output of the time series forecasting model. The prediction platform 115 may create trips and/or schedule charging sessions for electric vehicles in consideration of a current/predicted state of charge of electric vehicles and use the information output by the time series forecasting model to determine whether to incorporate a charging session at an EVCU as a part of the trips and/or the charging sessions. For example, an electric vehicle user's trip is estimated to last from 8 AM to 4 PM, and the prediction platform 115 estimates that an EVCU will be close to a portion of the route around 11 AM. In such example, the time series forecasting model predicts that a state of charge of the power supply of the EVCU will be at 80 percent at 11 AM and provides a recommendation for the user to make a detour for charging his/her vehicle at the EVCU around 11 AM as a part of the user's trip.

FIG. 12 illustrates a flowchart of a process 1200 for determining a probability of which a vehicle encounters one or more EVCUs while traversing one or more road segments and providing an application based on the probability, according to one example embodiment. In various embodiments, the prediction platform 115 may perform one or more portions of the process 1200 and may be implemented in, for instance, a chip set including a processor and a memory as shown in FIG. 14 or in circuitry, hardware, firmware, software, or in any combination thereof. As such, the prediction platform 115 can provide means for accomplishing various parts of the process 1200, as well as means for accomplishing embodiments of other processes described herein in conjunction with other components of the system 100. Although the process 1200 is illustrated and described as a sequence of steps, it is contemplated that various embodiments of the process 1200 may be performed in any order or combination and need not include all of the illustrated steps.

In step 1201, the prediction platform 115 receives a training dataset indicating events in which vehicles encountered EVCUs or did not encounter EVCUs while traversing one or more road segments and attributes associated with said events. The attributes may indicate, for each of the events: (i) a functional class of a road segment in which an EVCU was observed; (ii) a congestion level of the road segment; (iii) an average number of electric vehicles within a region in which the EVCU was observed; (iv) a temperature level of the region in which the EVCU was observed; (v) a humidity level of the region in which the EVCU was observed; (vi) an epoch in which the EVCU was observed (e.g., whether the EVCU was observed on a weekday or a weekend); (vii) a number of parking areas adjacent to a route of the vehicle; or (viii) a combination thereof.

In step 1203, the prediction platform 115 trains a machine learning model to output a probability of which a vehicle encounters one or more EVCUs while traversing one or more road segments based on the training dataset. In one embodiment, the machine learning model may be a supervised machine learning classification model. In such embodiment, the attributes associated with each of the events are labeled as either an event in which a vehicle encountered at least one EVCU while traversing one or more road segments or an event in which a vehicle did not encounter any EVCUs while traversing one or more road segments. In such embodiment, the machine learning model is trained using a classification algorithm, such as logistic regression, decision trees, random forests, support vector machines (SVM), neural networks, etc.

In step 1205, the prediction platform 115 receives input data indicating attributes associated with one or more road segments. The input data may be input features indicating the attributes. The attributes correspond to the attributes used to train the machine learning model (e.g., a functional class of the one or more road segments, the congestion level of the one or more road segments, etc.).

In step 1207, the prediction platform 115 causes a machine learning model to output a probability of which a vehicle encounters one or more EVCUs while traversing the one or more road segments as a function of the input data. The machine learning model may output target labels indicating whether or not a vehicle will encounter one or more EVCUs while traversing the one or more road segments as a function of input features indicating attributes corresponding to the attributes used to train the machine learning model (e.g., a functional class of the one or more road segments, the congestion level of the one or more road segments, etc.). In one embodiment, the target labels may be associated with confidence scores indicating the machine learning model's levels of certainty in its predictions. In such embodiment, the confidence score associated with the target label indicating that a vehicle will encounter one or more EVCUs while traversing one or more road segments may be the probability of which the vehicle encountering one or more EVCUs while traversing the one or more road segments.

In step 1209, the prediction platform 115 provides an application based on the probability output by the machine learning model. In one embodiment, the prediction platform 115 generates and recommends a route for an electric vehicle user based on the probability. In one embodiment, the route may be generated such that one or more road segments or a specific road segment within the route is associated with a high probability of which the user's electric vehicle will encounter one or more EVCUs.

Figure 13:
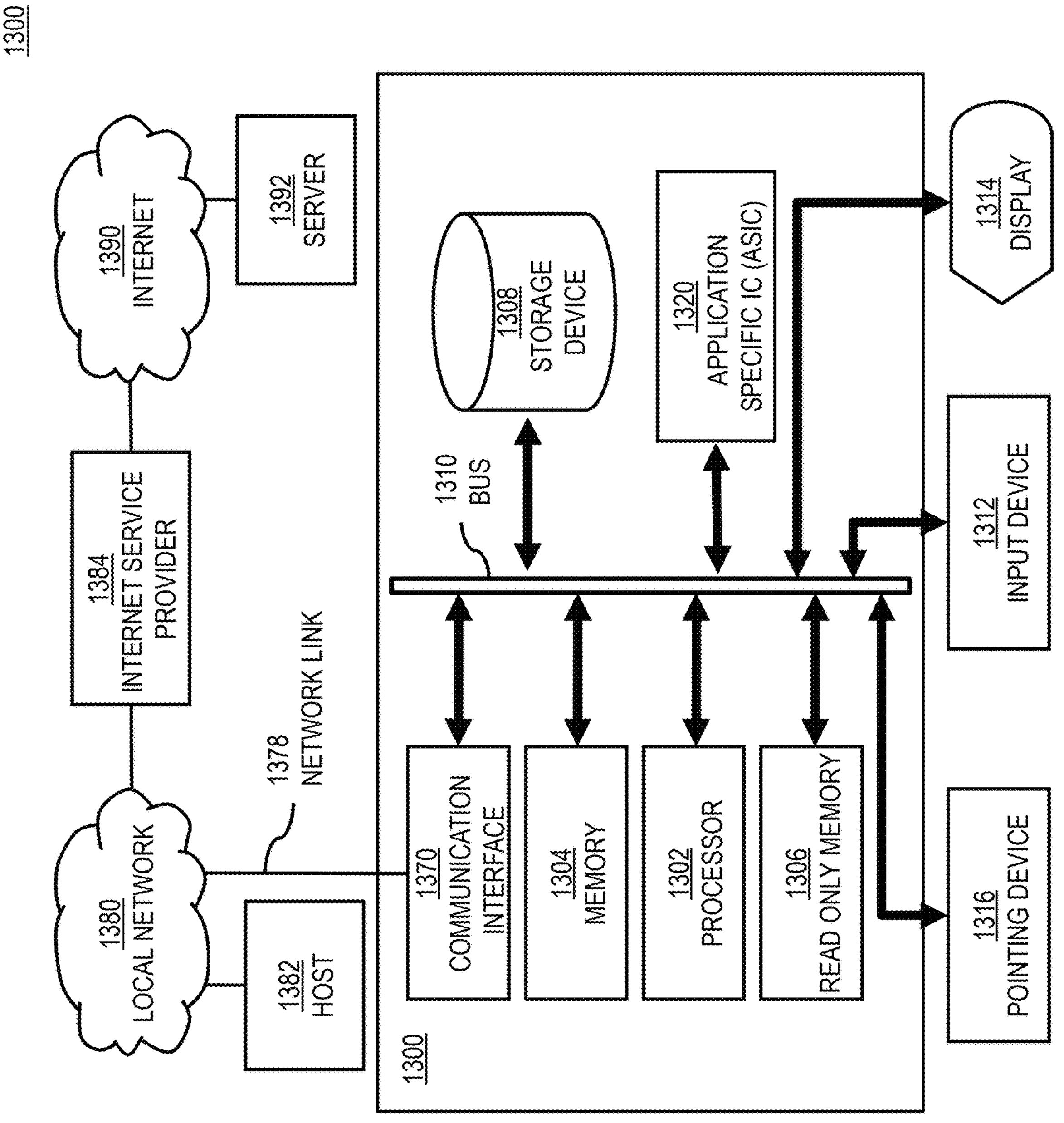
FIG. 13 illustrates a computing system upon which an embodiment of the invention may be implemented.

FIG. 13 illustrates a computing system 1300 upon which an embodiment of the invention may be implemented. The computing system 1300 is programmed (e.g., via computer program code or instructions) to provide EVCUs to electric vehicles as described herein and includes a communication mechanism such as a bus 1310 for passing information between other internal and external components of the computing system 1300. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1310 includes one or more parallel conductors of information so that information is transferred quickly among devices coupled to the bus 1310. One or more processors 1302 for processing information are coupled with the bus 1310.

A processor 1302 performs a set of operations on information as specified by computer program code related to providing EVCUs to electric vehicles. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1310 and placing information on the bus 1310. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1302, such as a sequence of operation codes, constitute processor instructions, also called computer system instructions or, simply, computer instructions. Processors may be implemented as mechanical, electrical, magnetic, optical, chemical or quantum components, among others, alone or in combination.

Computing system 1300 also includes a memory 1304 coupled to bus 1310. The memory 1304, such as a random access memory (RAM) or other dynamic storage device, stores information including processor instructions for providing EVCUs to electric vehicles. Dynamic memory allows information stored therein to be changed by the computing system 1300. RAM allows a unit of information stored at a location called a memory address to be stored and retrieved independently of information at neighboring addresses. The memory 1304 is also used by the processor 1302 to store temporary values during execution of processor instructions. The computer 1300 also includes a read only memory (ROM) 1306 or other static storage device coupled to the bus 1310 for storing static information, including instructions, that is not changed by the computer 1300. Some memory is composed of volatile storage that loses the information stored thereon when power is lost. Also coupled to bus 1310 is a non-volatile (persistent) storage device 1308, such as a magnetic disk, optical disk or flash card, for storing information, including instructions, that persists even when the computing system 1300 is turned off or otherwise loses power.

Information, including instructions for providing EVCUs to electric vehicles, is provided to the bus 1310 for use by the processor from an external input device 1312, such as a keyboard containing alphanumeric keys operated by a human user, or a sensor. A sensor detects conditions in its vicinity and transforms those detections into physical expression compatible with the measurable phenomenon used to represent information in computing system 1300. Other external devices coupled to bus 1310, used primarily for interacting with humans, include a display device 1314, such as a cathode ray tube (CRT) or a liquid crystal display (LCD), or plasma screen or printer for presenting text or images, and a pointing device 1316, such as a mouse or a trackball or cursor direction keys, or motion sensor, for controlling a position of a small cursor image presented on the display 1314 and issuing commands associated with graphical elements presented on the display 1314. In some embodiments, for example, in embodiments in which the computing system 1300 performs all functions automatically without human input, one or more of external input device 1312, display device 1314 and pointing device 1316 is omitted.

In the illustrated embodiment, special purpose hardware, such as an application specific integrated circuit (ASIC) 1320, is coupled to bus 1310. The special purpose hardware is configured to perform operations not performed by processor 1302 quickly enough for special purposes. Examples of application specific ICs include graphics accelerator cards for generating images for display 1314, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computing system 1300 also includes one or more instances of a communications interface 1370 coupled to bus 1310. Communication interface 1370 provides a one-way or two-way communication coupling to a variety of external devices that operate with their own processors, such as printers, scanners and external disks. In general the coupling is with a network link 1378 that is connected to a local network 1380 to which a variety of external devices with their own processors are connected. For example, communication interface 1370 may be a parallel port or a serial port or a universal serial bus (USB) port on a personal computer. In some embodiments, communications interface 1370 is an integrated services digital network (ISDN) card or a digital subscriber line (DSL) card or a telephone modem that provides an information communication connection to a corresponding type of telephone line. In some embodiments, a communication interface 1370 is a cable modem that converts signals on bus 1310 into signals for a communication connection over a coaxial cable or into optical signals for a communication connection over a fiber optic cable. As another example, communications interface 1370 may be a local area network (LAN) card to provide a data communication connection to a compatible LAN, such as Ethernet. Wireless links may also be implemented. For wireless links, the communications interface 1370 sends or receives or both sends and receives electrical, acoustic or electromagnetic signals, including infrared and optical signals, that carry information streams, such as digital data. For example, in wireless handheld devices, such as mobile telephones like cell phones, the communications interface 1370 includes a radio band electromagnetic transmitter and receiver called a radio transceiver. In certain embodiments, the communications interface 1370 enables connection to the communication network 127 for providing EVCUs to electric vehicles.

The term computer-readable medium is used herein to refer to any medium that participates in providing information to processor 1302, including instructions for execution. Such a medium may take many forms, including, but not limited to, non-volatile media, volatile media and transmission media. Non-volatile media include, for example, optical or magnetic disks, such as storage device 1308. Volatile media include, for example, dynamic memory 1304. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Network link 1378 typically provides information communication using transmission media through one or more networks to other devices that use or process the information. For example, network link 1378 may provide a connection through local network 1380 to a host computer 1382 or to equipment 1384 operated by an Internet Service Provider (ISP). ISP equipment 1384 in turn provides data communication services through the public, world-wide packet-switching communication network of networks now commonly referred to as the Internet 1390.

A computer called a server host 1392 connected to the Internet hosts a process that provides a service in response to information received over the Internet. For example, server host 1392 hosts a process that provides information representing video data for presentation at display 1314. It is contemplated that the components of system can be deployed in various configurations within other computer systems, e.g., host 1382 and server 1392.

FIG. 14 illustrates a chip set 1400 upon which an embodiment of the invention may be implemented. Chip set 1400 is programmed to provide EVCUs to electric vehicles as described herein and includes, for instance, the processor and memory components described with respect to FIG. 13 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1400 includes a communication mechanism such as a bus 1401 for passing information among the components of the chip set 1400. A processor 1403 has connectivity to the bus 1401 to execute instructions and process information stored in, for example, a memory 1405. The processor 1403 may include one or more processing cores with each core configured to perform independently. A multi-core processor enables multiprocessing within a single physical package. Examples of a multi-core processor include two, four, eight, or greater numbers of processing cores. Alternatively or in addition, the processor 1403 may include one or more microprocessors configured in tandem via the bus 1401 to enable independent execution of instructions, pipelining, and multithreading. The processor 1403 may also be accompanied with one or more specialized components to perform certain processing functions and tasks such as one or more digital signal processors (DSP) 1407, or one or more application-specific integrated circuits (ASIC) 1409. A DSP 1407 typically is configured to process real-world signals (e.g., sound) in real time independently of the processor 1403. Similarly, an ASIC 1409 can be configured to perform specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1403 and accompanying components have connectivity to the memory 1405 via the bus 1401. The memory 1405 includes both dynamic memory (e.g., RAM, magnetic disk, writable optical disk, etc.) and static memory (e.g., ROM, CD-ROM, etc.) for storing executable instructions that when executed perform the inventive steps described herein to providing EVCUs to electric vehicles. The memory 1405 also stores the data associated with or generated by the execution of the inventive steps.

Figure 15:
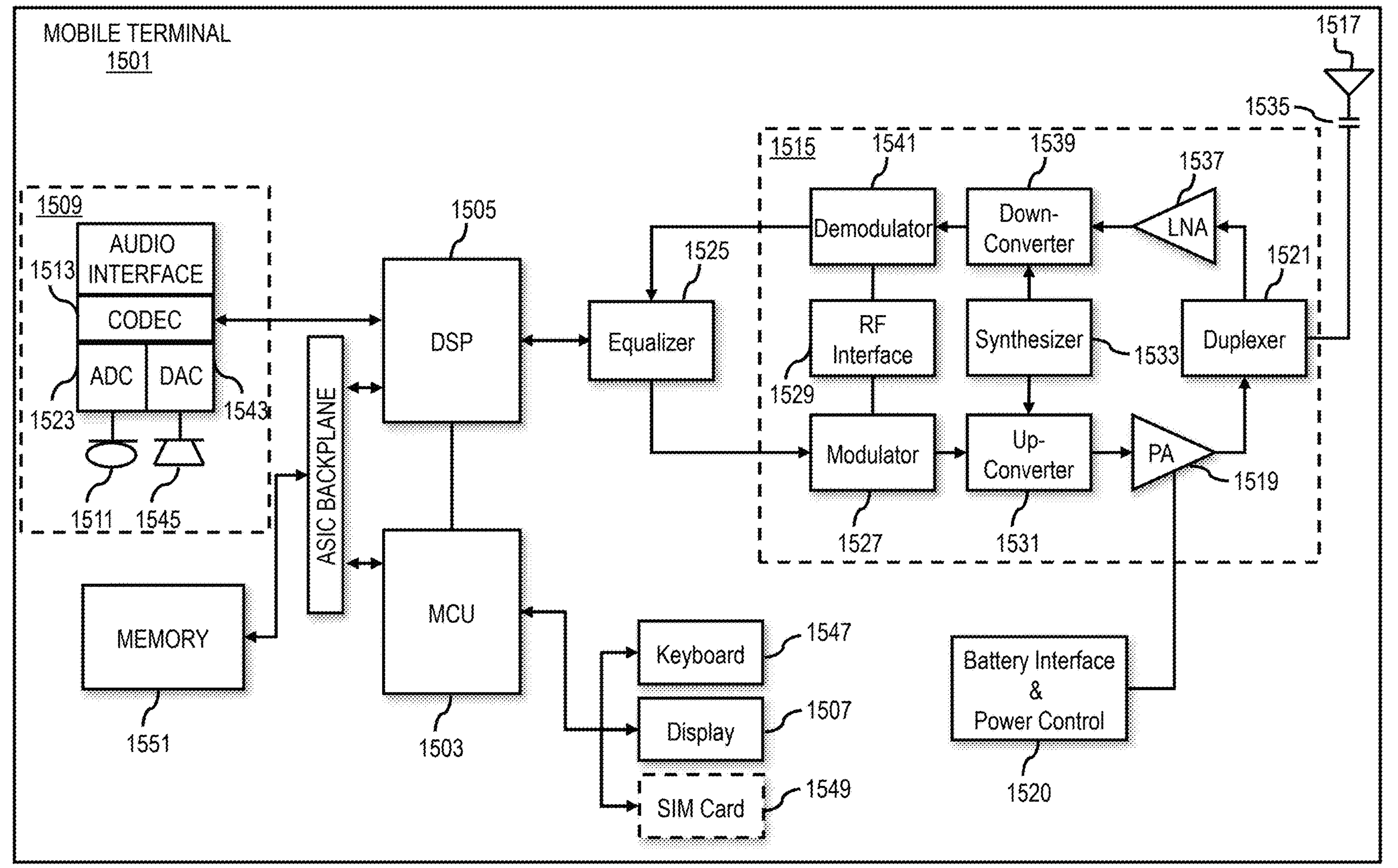
FIG. 15 illustrates a diagram of exemplary components of a mobile terminal capable of operating in the system of FIG. 1, according to one embodiment.

FIG. 15 is a diagram of exemplary components of a mobile terminal 1501 (e.g., UE 111 and/or component thereof) capable of operating in the system 100 of FIG. 1, according to one embodiment. Generally, a radio receiver is often defined in terms of front-end and back-end characteristics. The front end of the receiver encompasses all of the Radio Frequency (RF) circuitry whereas the back end encompasses all of the base-band processing circuitry. Pertinent internal components of the telephone include a Main Control Unit (MCU) 1503, a Digital Signal Processor (DSP) 1505, and a receiver/transmitter unit including a microphone gain control unit and a speaker gain control unit. A main display unit 1507 provides a display to the user in support of various applications and mobile station functions that offer automatic contact matching. An audio function circuitry 1509 includes a microphone 1511 and microphone amplifier that amplifies the speech signal output from the microphone 1511. The amplified speech signal output from the microphone 1511 is fed to a coder/decoder (CODEC) 1513.

A radio section 1515 amplifies power and converts frequency in order to communicate with a base station, which is included in a mobile communication system, via antenna 1517. The power amplifier (PA) 1519 and the transmitter/modulation circuitry are operationally responsive to the MCU 1503, with an output from the PA 1519 coupled to the duplexer 1521 or circulator or antenna switch, as known in the art. The PA 1519 also couples to a battery interface and power control unit 1520.

In use, a user of mobile station 1501 speaks into the microphone 1511 and his or her voice along with any detected background noise is converted into an analog voltage. The analog voltage is then converted into a digital signal through the Analog to Digital Converter (ADC) 1523. The control unit 1503 routes the digital signal into the DSP 1505 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, 5G New Radio networks, code division multiple access (CDMA), wireless fidelity (WiFi), satellite, and the like.

The encoded signals are then routed to an equalizer 1525 for compensation of any frequency-dependent impairments that occur during transmission though the air such as phase and amplitude distortion. After equalizing the bit stream, the modulator 1527 combines the signal with a RF signal generated in the RF interface 1529. The modulator 1527 generates a sine wave by way of frequency or phase modulation. In order to prepare the signal for transmission, an up-converter 1531 combines the sine wave output from the modulator 1527 with another sine wave generated by a synthesizer 1533 to achieve the desired frequency of transmission. The signal is then sent through a PA 1519 to increase the signal to an appropriate power level. In practical systems, the PA 1519 acts as a variable gain amplifier whose gain is controlled by the DSP 1505 from information received from a network base station. The signal is then filtered within the duplexer 1521 and optionally sent to an antenna coupler 1535 to match impedances to provide maximum power transfer. Finally, the signal is transmitted via antenna 1517 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1501 are received via antenna 1517 and immediately amplified by a low noise amplifier (LNA) 1537. A down-converter 1539 lowers the carrier frequency while the demodulator 1541 strips away the RF leaving only a digital bit stream. The signal then goes through the equalizer 1525 and is processed by the DSP 1505. A Digital to Analog Converter (DAC) 1543 converts the signal and the resulting output is transmitted to the user through the speaker 1545, all under control of a Main Control Unit (MCU) 1503—which can be implemented as a Central Processing Unit (CPU) (not shown).

The MCU 1503 receives various signals including input signals from the keyboard 1547. The keyboard 1547 and/or the MCU 1503 in combination with other user input components (e.g., the microphone 1511) comprise a user interface circuitry for managing user input. The MCU 1503 runs a user interface software to facilitate user control of at least some functions of the mobile station 1501 to provide EVCUs to electric vehicles. The MCU 1503 also delivers a display command and a switch command to the display 1507 and to the speech output switching controller, respectively. Further, the MCU 1503 exchanges information with the DSP 1505 and can access an optionally incorporated SIM card 1549 and a memory 1551. In addition, the MCU 1503 executes various control functions required of the station. The DSP 1505 may, depending upon the implementation, perform any of a variety of conventional digital processing functions on the voice signals. Additionally, DSP 1505 determines the background noise level of the local environment from the signals detected by microphone 1511 and sets the gain of microphone 1511 to a level selected to compensate for the natural tendency of the user of the mobile station 1501.

The CODEC 1513 includes the ADC 1523 and DAC 1543. The memory 1551 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1551 may be, but not limited to, a single memory, CD, DVD, ROM, RAM, EEPROM, optical storage, or any other non-volatile or non-transitory storage medium capable of storing digital data.

An optionally incorporated SIM card 1549 carries, for instance, important information, such as the cellular phone number, the carrier supplying service, subscription details, and security information. The SIM card 1549 serves primarily to identify the mobile station 1501 on a radio network. The card 1549 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

We claim:

1. An apparatus comprising at least one processor and at least one non-transitory memory including computer program code instructions, the computer program code instructions configured to, when executed, cause the apparatus to:
- receive a training dataset indicating information associated with electric vehicles having a state of charge that is less than a predetermined amount, wherein the information indicates, for each of the electric vehicles, one or more attributes of a region in which said electric vehicle was located while having the state of charge; and
- based on the training dataset, train a machine learning model to output a probability of which an electric vehicle charging unit (EVCU) is required at a target region as a function of input data indicating one or more attributes of the target region.

2. The apparatus of claim 1, wherein the one or more attributes of the region indicates: (i) an average number of electric vehicles within the region; (ii) one or more lengths of one or more functional classes of one or more road segments within the region; (iii) a vehicle density of the region; (iv) a vehicle congestion level of the region; (v) a weather condition of the region; (vi) a number of electric vehicle charging stations within the region; or (vii) a combination thereof.

3. The apparatus of claim 2, wherein the one or more attributes of the target region indicates: (i) an average number of electric vehicles within the target region; (ii) one or more lengths of one or more functional classes of one or more road segments within the target region; (iii) a vehicle density of the target region; (iv) a vehicle congestion level of the target region; (v) a weather condition of the target region; (vi) a number of electric vehicle charging stations within the target region; or (vii) a combination thereof.

4. The apparatus of claim 1, wherein the predetermined amount is less than half of a maximum state of charge for each of the electric vehicles.

5. The apparatus of claim 1, wherein the computer program code instructions are configured to, when executed, cause the apparatus to, subsequent to training the machine learning model based on the training dataset:
- receive the input data;
- provide the input data to the machine learning model; and
- cause the machine learning model to output the probability.

6. The apparatus of claim 1, wherein the computer program code instructions are configured to, when executed, cause the apparatus to, subsequent to training the machine learning model based on the training dataset:
- estimate a range of which the EVCU is capable of traversing;
- determine a zone encompassing a geographical region based on the range;
- divide the zone into a plurality of subregions;
- for each of the plurality of subregions:
  - receive the input data, wherein the target region is said subregion;
  - provide the input data to the machine learning model;
  - cause the machine learning model to output the probability; and
  - associate said subregion with the probability;
- generate one or more clusters within the zone, wherein each of the one or more clusters include one or more of the plurality of subregions;
- calculate a value for each of the one or more clusters based on the probability associated with each subregion within said cluster;
- select one of the one or more clusters based on the value; and
- assign a location within the one of the one or more clusters for deploying the EVCU.

7. The apparatus of claim 6, wherein the one or more clusters are generated via k-means clustering.

8. The apparatus of claim 6, wherein the value is a mean value of all probabilities of all subregions within said cluster.

9. The apparatus of claim 8, wherein the one of the one or more clusters has the greatest mean value among the one or more clusters.

10. The apparatus of claim 1, wherein the computer program code instructions are configured to, when executed, cause the apparatus to:
- determine, based on the probability output by the machine learning model for each of a plurality of subregions of a geographical region, a deployment location for the EVCU within the geographic area; and
- cause the EVCU to be positioned at the deployment location, wherein the deployment location is determined based on a comparison of the probabilities of the plurality of subregions.

11. The apparatus of claim 6, wherein the location is a centroid of the one of the one or more clusters.

12. A non-transitory computer-readable storage medium having computer program code instructions stored therein, the computer program code instructions, when executed by at least one processor, cause the at least one processor to:
- receive a training dataset indicating information associated with electric vehicles having a state of charge that is less than a predetermined amount, wherein the information indicates, for each of the electric vehicles, one or more attributes of a region in which said electric vehicle was located while having the state of charge; and
- based on the training dataset, train a machine learning model to output a probability of which an electric vehicle charging unit (EVCU) is required in a target region as a function of input data indicating one or more attributes of the target region.

13. The non-transitory computer-readable storage medium of claim 12, wherein the one or more attributes of the region indicates: (i) an average number of electric vehicles within the region; (ii) one or more lengths of one or more functional classes of one or more road segments within the region; (iii) a vehicle density of the region; (iv) a vehicle congestion level of the region; (v) a weather condition of the region; (vi) a number of electric vehicle charging stations within the region; or (vii) a combination thereof.

14. The non-transitory computer-readable storage medium of claim 13, wherein the one or more attributes of the target region indicates: (i) an average number of electric vehicles within the target region; (ii) one or more lengths of one or more functional classes of one or more road segments within the target region; (iii) a vehicle density of the target region; (iv) a vehicle congestion level of the target region; (v) a weather condition of the target region; (vi) a number of electric vehicle charging stations within the target region; or (vii) a combination thereof.

15. The non-transitory computer-readable storage medium of claim 12, wherein the predetermined amount is less than half of a maximum state of charge for each of the electric vehicles.

16. The non-transitory computer-readable storage medium of claim 12, wherein the computer program code instructions, when executed by the at least one processor, cause the at least one processor to:

receive the input data;

provide the input data to the machine learning model; and cause the machine learning model to output the probability.

17. A method comprising:

receiving a training dataset indicating information associated with electric vehicles having a state of charge that is less than a predetermined amount, wherein the information indicates, for each of the electric vehicles, one or more attributes of a region in which said electric vehicle was located while having the state of charge; and based on the training dataset, training a machine learning model to output a probability of which an electric vehicle charging unit (EVCU) is required at a target region as a function of input data indicating one or more attributes of the target region.

18. The method of claim 17, wherein the one or more attributes of the region indicates: (i) an average number of electric vehicles within the region; (ii) one or more lengths of one or more functional classes of one or more road segments within the region; (iii) a vehicle density of the region; (iv) a vehicle congestion level of the region; (v) a weather condition of the region; (vi) a number of electric vehicle charging stations within the region; or (vii) a combination thereof.

19. The method of claim 18, wherein the one or more attributes of the target region indicates: (i) an average number of electric vehicles within the target region; (ii) one or more lengths of one or more functional classes of one or more road segments within the target region; (iii) a vehicle density of the target region; (iv) a vehicle congestion level of the target region; (v) a weather condition of the target region; (vi) a number of electric vehicle charging stations within the target region; or (vii) a combination thereof.

20. The method of claim 17, wherein the predetermined amount is less than half of a maximum state of charge for each of the electric vehicles.

* * * * *